US012639532B2

(12) United States Patent
Janakiraman et al.

(10) Patent No.: US 12,639,532 B2
(45) Date of Patent: May 26, 2026

(54) GENERATING MULTI-ORDER TEXT QUERY RESULTS UTILIZING A CONTEXT ORCHESTRATION ENGINE

(71) Applicant: Dropbox, Inc., San Francisco, CA (US)

(72) Inventors: Rajkumar Janakiraman, Sammamish, WA (US); Ranjitha Gurunath Kulkarni, Sunnyvale, CA (US)

(73) Assignee: Dropbox, Inc., San Francisco, CA (US)

( * ) Notice: Subject to any disclaimer, the term of this patent is extended or adjusted under 35 U.S.C. 154(b) by 429 days.

(21) Appl. No.: 18/309,496

(22) Filed: Apr. 28, 2023

(65) Prior Publication Data

US 2024/0281621 A1 Aug. 22, 2024

Related U.S. Application Data

(60) Provisional application No. 63/486,217, filed on Feb. 21, 2023.

(51) Int. Cl.
*G06F 40/47* (2020.01)
*G06F 40/51* (2020.01)

(52) U.S. Cl.
CPC .............. *G06F 40/47* (2020.01); *G06F 40/51* (2020.01)

(58) Field of Classification Search
CPC ................................ G06F 40/47; G06F 40/51
See application file for complete search history.

(56) References Cited

U.S. PATENT DOCUMENTS

| | | | |
|---|---|---|---|
| 8,001,117 B2 | 8/2011 | Yahia et al. | |
| 8,332,394 B2 | 12/2012 | Fan et al. | |

| | | | |
|---|---|---|---|
| 8,340,955 B2 | 12/2012 | Brown et al. | |
| 8,799,316 B1 | 8/2014 | Bahrami et al. | |
| 9,460,088 B1 | 10/2016 | Sak et al. | |
| 9,626,622 B2 | 4/2017 | Allen et al. | |

(Continued)

OTHER PUBLICATIONS

Das J., et al., "A Geospatial Orchestration Framework on Cloud for Processing User Queries," IEEE International Conference on Cloud Computing in Emerging Markets (CCEM), Oct. 2016, 8 pages.

(Continued)

*Primary Examiner* — Richemond Dorvil
*Assistant Examiner* — Ethan Daniel Kim
(74) *Attorney, Agent, or Firm* — Keller Preece PLLC

(57) ABSTRACT

The present disclosure is directed toward systems, methods, and non-transitory computer-readable media for generating responses to multi-order text queries using a context orchestration engine. For example, the disclosed systems generate context-defining query subcomponents from a multi-order text query, where the context-defining query subcomponents indicate contextual data sources pertaining to their respective portions of the multi-order text query. In addition, the disclosed systems provide or transmit the context-defining query subcomponents to a large language model for domain-specific computer code pertaining to each respective context-defining query subcomponent. The disclosed systems can further execute the generated computer code for each context-defining query subcomponent to access indicated contextual data sources for generating component-specific results. The disclosed systems can also generate a multi-order result to the multi-order text query from the component-specific results.

20 Claims, 18 Drawing Sheets

(56)     References Cited

U.S. PATENT DOCUMENTS

| | | | |
|---|---|---|---|
| 9,697,477 B2 | 7/2017 | Oh et al. | |
| 10,235,681 B2 | 3/2019 | Chang et al. | |
| 10,558,458 B2 | 2/2020 | Iwanir et al. | |
| 12,067,366 B1 * | 8/2024 | Heller | G06F 40/35 |
| 2011/0040749 A1 | 2/2011 | Ceri et al. | |
| 2021/0349887 A1 | 11/2021 | Alonzo et al. | |
| 2023/0074406 A1 * | 3/2023 | Baeuml | G06F 16/90332 |
| 2025/0022615 A1 * | 1/2025 | Corneil | G06N 3/042 |

OTHER PUBLICATIONS

Wang J., et al., "Boundary-Spanning Search and Firms' Green Innovation: The Moderating Role of Resource Orchestration Capability," Feb. 2020, Wiley, Business Strategy and the Environment, vol. 29, No. 2, pp. 361-374.

Arun Raj., "ChatGPT for SQL Queries. You might have already tried out," Medium, Dec. 19, 2022, 11 pages, Retrieved from the Internet: URL: https://arun-raj.medium.com/chatgpt-for-sql-queries-a97960bad29b.

Braga D., et al., "Optimization Of Multi-domain Queries on the Web," Proceedings of the VLDB Endowment; ACM Digital Library], Assoc. Of Computing Machinery, vol. 1(1), Aug. 1, 2008, pp. 562-573.

International Search Report and Written Opinion for Application No. PCT/US2023/079899, mailed on Mar. 1, 2024, 12 pages.

International Preliminary Report on Patentability for PCT Application No. PCT/US2023/079899, dated Sep. 4, 2025, 8 pages.

* cited by examiner

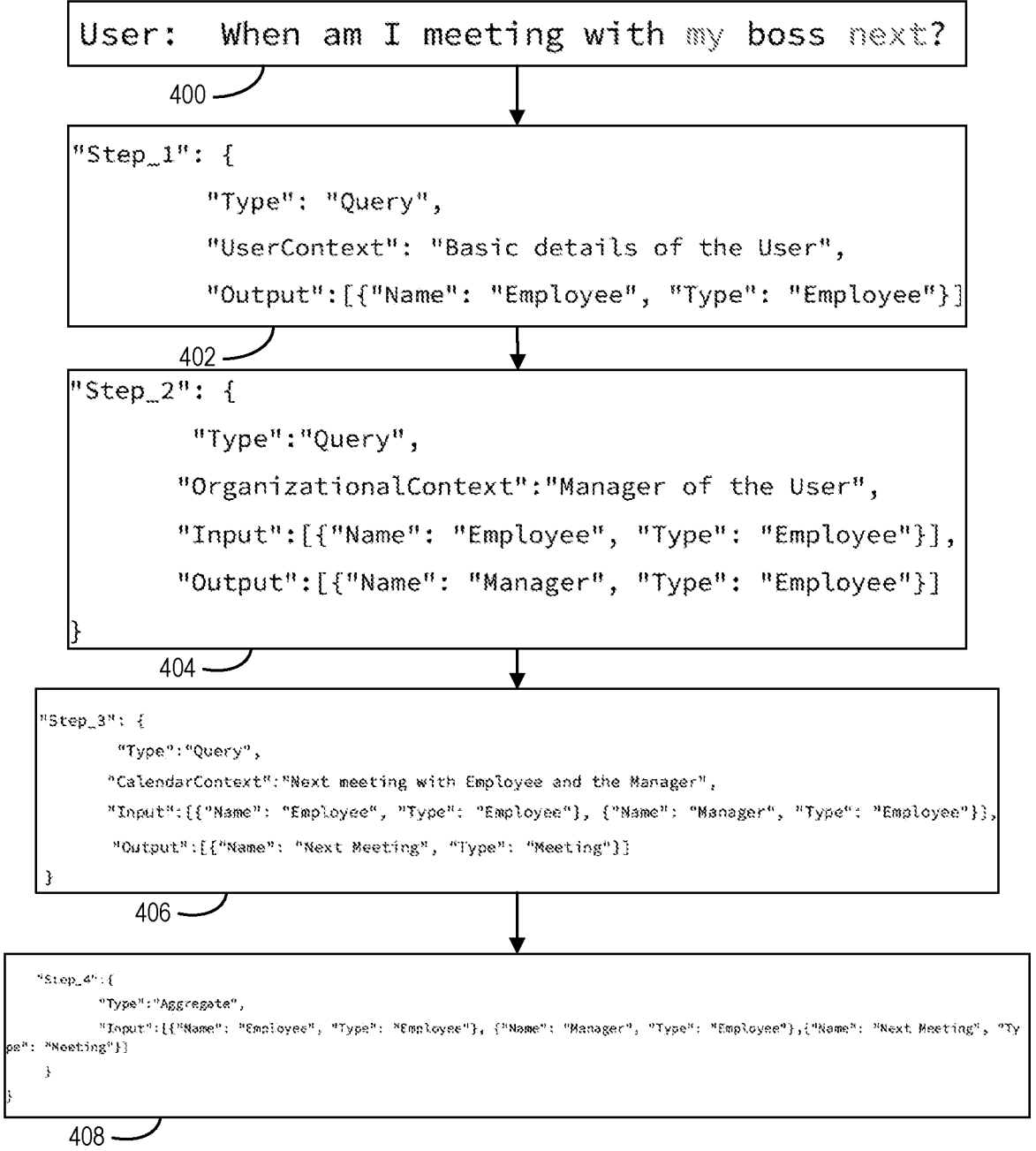

```
User:  When am I meeting with my boss next?
```
400

```
"Step_1": {
        "Type": "Query",
        "UserContext": "Basic details of the User",
        "Output":[{"Name": "Employee", "Type": "Employee"}]
```
402

```
"Step_2": {
         "Type":"Query",
        "OrganizationalContext":"Manager of the User",
        "Input":[{"Name": "Employee", "Type": "Employee"}],
        "Output":[{"Name": "Manager", "Type": "Employee"}]
}
```
404

```
"Step_3": {
        "Type":"Query",
      "CalendarContext":"Next meeting with Employee and the Manager",
     "Input":[{"Name": "Employee", "Type": "Employee"}, {"Name": "Manager", "Type": "Employee"}],
        "Output":[{"Name": "Next Meeting", "Type": "Meeting"}]
}
```
406

```
"Step_4":{
        "Type":"Aggregate",
        "Input":[{"Name": "Employee", "Type": "Employee"}, {"Name": "Manager", "Type": "Employee"},{"Name": "Next Meeting", "Ty
pe": "Meeting"}]
     }
}
```
408

*Fig. 4A*

```
User: Schedule a meeting with the internal expert in Generative LLM topic.
```

410

```
"Step_1": {
        "Type": "Query",
        "UserContext": "Basic details of the User",
        "Output":[{"Name": "User", "Type": "Employee"}]
},
```

412

```
"Step_2": {
        "Type":"Query",
        "OrganizationalContext":"Internal expert in Generative LLM topic",
        "Input":[{"Name": "Generative LLM", "Type": "Topic"}],
        "Output":[{"Name": "Expert", "Type": "Employee"}]
}
```

414

```
"Step_3": {
        "Type":"Query",
        "CalendarContext":"Available time slots for User and Expert",
        "Input":[{"Name": "User", "Type": "Employee"}, {"Name": "Expert", "Type": "Employee"}],
        "Output":[{"Name": "Time Slots", "Type": "List"}]
}
```

416

```
"Step_4":{
        "Type":"Select",
        "Input":[{"Name": "Time Slots", "Type": "List"}],
        "Output":[{"Name": "Preferred Time Slot", "Type": "Time"}]
}
```

418

```
"Step_5":{
        "Type":"Create",
        "CalendarContext":"Create a meeting with User and Expert at Preferred Time Slot",
        "Input":[{"Name": "User", "Type": "Employee"}, {"Name": "Expert", "Type": "Employee"}, {"Name": "Preferred Time Slot",
"Type": "Time"}],
        "Output":[{"Name": "Meeting", "Type": "Meeting"}]
}
```

```
def get_next_meeting(employee1: Employee, employee2: Employee) -> Optional[Meeting]:

Assuming the meetings are sorted by start_time in ascending order

Find the first meeting that both employees are participating in for meeting in self.meetings:

if employee1.employee_email in meeting.participants_email and employee2.employee_email in meeting.participants_email:

return meeting

If no such meeting exists, return None return None
```

Fig. 4C

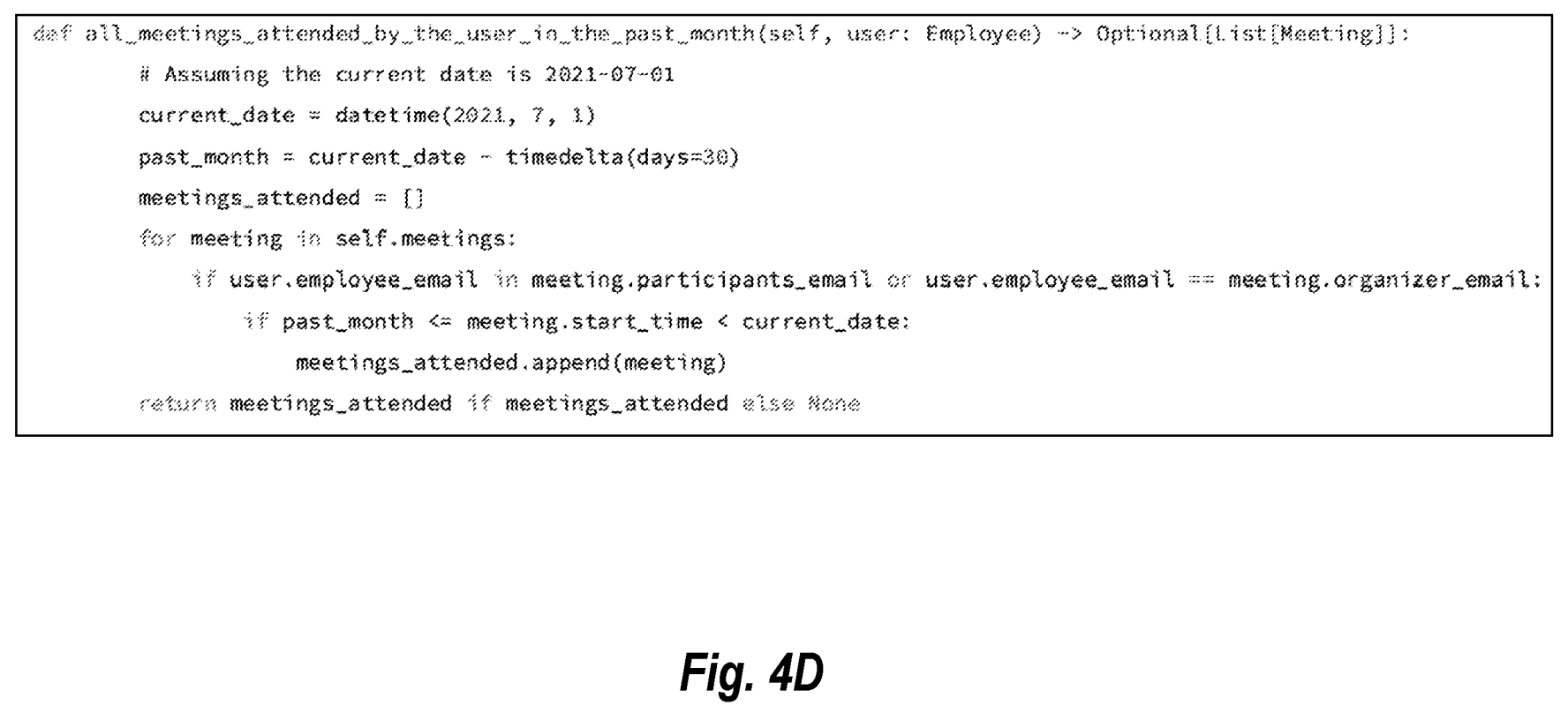

```
def all_meetings_attended_by_the_user_in_the_past_month(self, user: Employee) -> Optional[list[Meeting]]:

Assuming the current date is 2021-07-01 current_date = datetime(2021, 7, 1)

past_month = current_date - timedelta(days=30)

meetings_attended = []

for meeting in self.meetings:

if user.employee_email in meeting.participants_email or user.employee_email == meeting.organizer_email:

if past_month <= meeting.start_time < current_date:

meetings_attended.append(meeting)

return meetings_attended if meetings_attended else None
```

*Fig. 4D*

1200

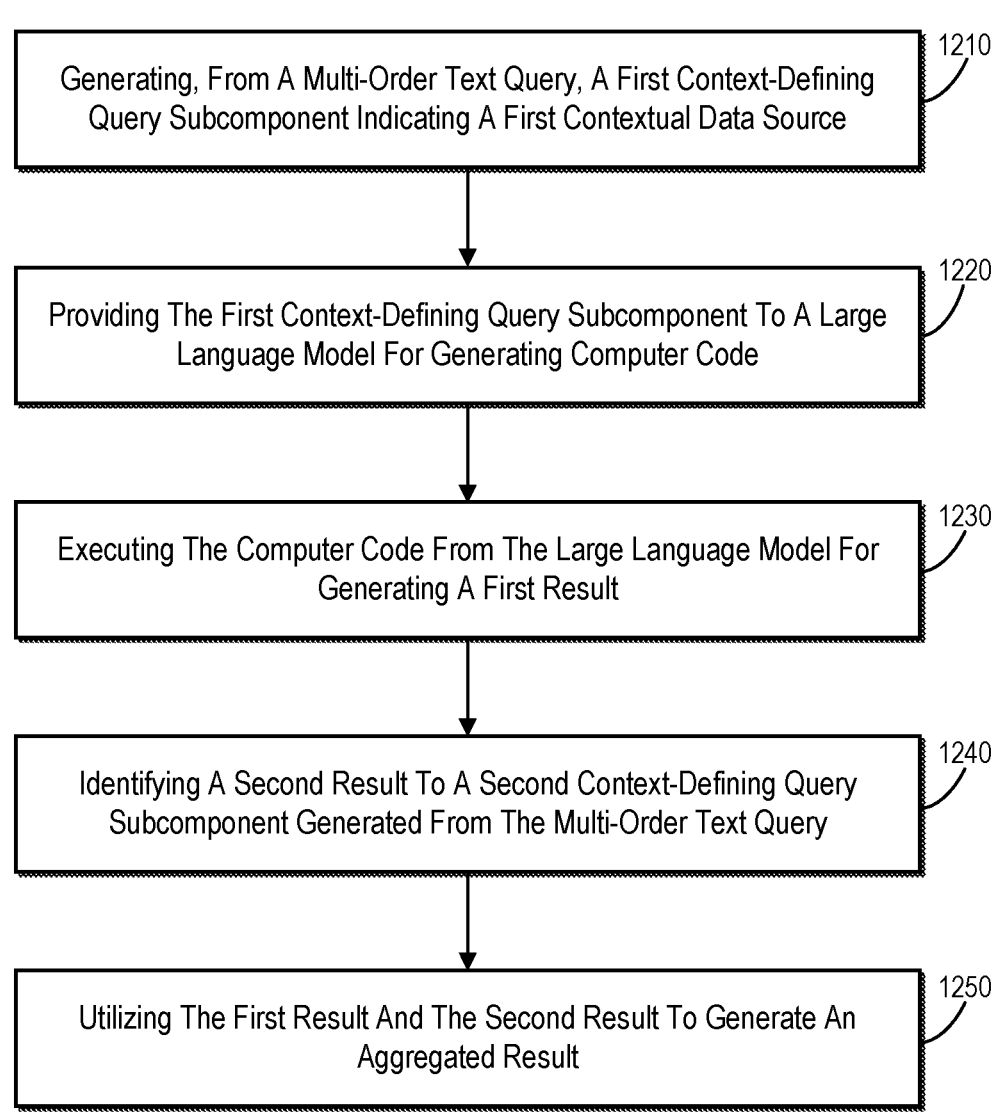

1210

Generating, From A Multi-Order Text Query, A First Context-Defining Query Subcomponent Indicating A First Contextual Data Source

1220

Providing The First Context-Defining Query Subcomponent To A Large Language Model For Generating Computer Code

1230

Executing The Computer Code From The Large Language Model For Generating A First Result

1240

Identifying A Second Result To A Second Context-Defining Query Subcomponent Generated From The Multi-Order Text Query

1250

Utilizing The First Result And The Second Result To Generate An Aggregated Result

GENERATING MULTI-ORDER TEXT QUERY RESULTS UTILIZING A CONTEXT ORCHESTRATION ENGINE

CROSS-REFERENCE TO RELATED APPLICATIONS

This application claims priority to and the benefit of U.S. Provisional Patent Application No. 63/486,217 filed on Feb. 21, 2023, which is incorporated herein by reference in its entirety.

BACKGROUND

Advancements in computing devices and networking technology have given rise to a variety of innovations in machine learning and network-based digital assistants. For example, local and web-based digital assistant applications can perform a variety of functions in response to single-order text queries, including finding single answers from a database and generating single-order content items. Despite these advances, however, existing digital assistant systems continue to suffer from a number of disadvantages, particularly in terms of flexibility and accuracy.

As just suggested, certain existing digital assistant systems are inflexible. More particularly, some existing systems are limited to generating responses for single-order text queries. To elaborate, many existing systems are rigidly fixed to processing or analyzing single-order text queries that specify a single task, a single source, and/or a single output for generating a response. However, such existing systems cannot flexibly adapt to text queries of higher orders (e.g., more than single-order) that require multifaceted response generation across multiple tasks, data sources, and/or combinations of various outputs. Indeed, solving higher-order problems and generating responses to higher-order text queries has long been a pursuit of networking and machine learning industries but has proven difficult or impossible given the rigid nature of prior systems.

Due at least in part to their inflexibility, some existing digital assistant systems are inaccurate. Indeed, as suggested, certain existing systems cannot generate responses to higher-order text queries. Accordingly, many existing systems generate erroneous responses to such higher-order text queries that are incomplete (e.g., targeted to only a single aspect of the text query) and/or nonsensical.

SUMMARY

This disclosure describes one or more embodiments of systems, methods, and non-transitory computer-readable storage media that provide benefits and/or solve one or more of the foregoing and other problems in the art. For instance, the disclosed systems provide a new system for generating responses to multi-order text queries using a context orchestration engine. For example, the disclosed systems generates, from a multi-order text query utilizing the context orchestration engine, a first context-defining query subcomponent, where the first context-defining query subcomponent indicates a first contextual data source for responding to the first context-defining query subcomponent. Further, the disclosed systems provide or transmit the first context-defining query subcomponent to a large language model for domain-specific computer code pertaining to the first context-defining query subcomponent. The disclosed systems can further execute the generated computer code for the first context-defining query subcomponent to access the indicated first contextual data source for generating a first result to the first context-defining query subcomponent. Moreover, the disclosed systems identify a second result to a second context-defining query subcomponent generated from the multi-order text query, which indicates a second contextual data source. Further, the disclosed systems utilize the first result and second result to generate an aggregated result in response to the multi-order text query. Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIGS. 4A-4B illustrate examples of the multi-order query result system generating context-defining subcomponents from a multi-order text query in accordance with one or more embodiments;

FIGS. 4C-4D illustrate example code generated in response to the multi-order query result system providing a context-defining query subcomponent to a large language model in accordance with one or more embodiments;

FIG. 12 illustrates an example series of acts performed by the multi-order query result system in accordance with one or more embodiments;

DETAILED DESCRIPTION

Figure 1:
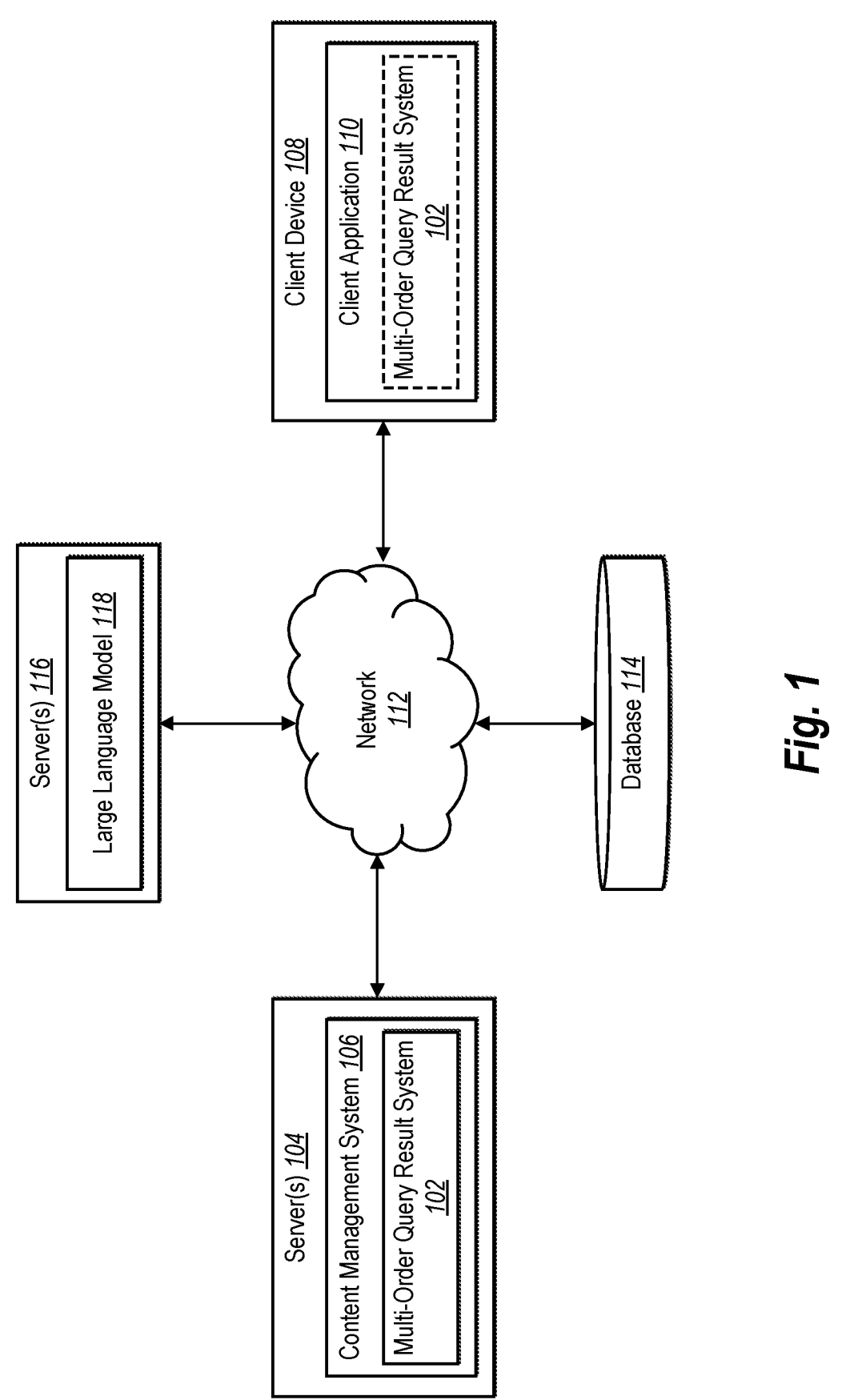
FIG. 1 illustrates a schematic diagram of an example environment of a multi-order query result system in accordance with one or more embodiments.

This disclosure describes one or more embodiments of a multi-order query result system that can generate results responsive to a multi-order text query utilizing a context orchestration engine integrated with a large language model. For example, the multi-order query result system provides contextualized results to a query received from a client device. In particular, the multi-order query result system breaks down a multi-order text query into multiple context-defining query subcomponents and generates computer code for the subcomponents utilizing a large language model. For instance, the multi-order query result system can generate results to the multi-order text query (e.g., a query with multiple steps that point to multiple contextual data sources). The results generated from the multi-order query result system include determinations (e.g., answers) in response a question or actions (e.g., execution of a computer function). Further, the results generated by the multi-order query result system can then be provided to the querying client device as a response, such that the multi-order query result system notifies the querying client device as to the result (e.g., the determination or the action performed).

To illustrate, by way of an example, the multi-order query result system can receive a multi-order text query such as "when is my next meeting with the head of accounting?" In response, the multi-order query result system can generate a response to this multi-order text query by accessing a first contextual data source corresponding to scheduled meetings for the user account and a second contextual data source corresponding to a user account ontology, and by further generating a result (e.g., a determination) that combines data from both contextual data sources to indicate a date and time.

As mentioned, the multi-order query result system can generate a result for a multi-order text query. To elaborate, the multi-order query result system receives a multi-order text query from a client device (e.g., as a typed question or a spoken question received via a microphone). From the multi-order text query, the multi-order query result system can extract or generate context-defining query subcomponents (e.g., breaking down the multi-order text query). For example, the multi-order query result system can utilize a contextual orchestration engine (e.g., one or more computer applications for software/network container orchestration that break down components of the multi-order text query and indicate various contextual data sources) to process or analyze the multi-order text query. In some cases, the multi-order query result system utilizes the contextual orchestration engine via a large language model to divide or compartmentalize the multi-order text query into multiple subcomponents, where each subcomponent points to (or calls or refers to) its own action (or step) and/or its own contextual data source for generating a respective result (e.g., a result specific to the context-defining query subcomponent).

In one or more embodiments, the multi-order query result system further generates or determines contextual data sources for each of the context-defining query subcomponents. More specifically, the multi-order query result system generates domain-specific language (e.g., plain language descriptions and/or computer code referencing the contextual data sources) that corresponds to and/or indicates the contextual data sources (e.g., external applications/systems/databases).

In some cases, the multi-order query result system further generates domain-specific computer code for generating results corresponding to each of the context-defining query subcomponents. For instance, the multi-order query result system generates a computer code segment for each query subcomponent, where each of the computer code segments is specific to the contextual data source that stores data for responding to its query subcomponent. In some cases, the multi-order query result system generates domain-specific computer code segments by providing contextual data (e.g., domain-specific language) to a large language model. Specifically, the multi-order query result system provides or transmits the multi-order text query to a large language model (e.g., ChatGPT or other large language model), whereupon the large language model breaks down the multi-order text query to query subcomponents and generates executable computer code associated with each query subcomponent. Indeed, the large language model generates an executable computer code segment for each query subcomponent, where the computer code segments are specific to each of the contextual data sources.

In some embodiments, the multi-order query result system further executes the computer code from the large language model. In particular, the multi-order query result system utilizes a contextual orchestration engine to execute computer code generated for each of the context-defining query subcomponents. Indeed, the multi-order query result system executes multiple computer code segments, where each computer code segment includes instructions for accessing a respective contextual data source for generating a result corresponding to a query subcomponent. In some cases, the multi-order query result system further generates an aggregated result to the multi-order text query by combining (e.g., compiling or summarizing) component-specific results generated via each computer code segment.

In addition, in one or more embodiments, the multi-order query result system integrates computer software applications from a variety of environments. For example, the multi-order query result system can integrate applications specific to an organizational ecosystem (e.g., a specific work entity). In doing so, the multi-order query result system provides results for multi-order text queries contextualized for a specific organizational ecosystem. Accordingly, the multi-order query result system acts as a powerful contextual search engine for a specific organization.

Moreover, in one or more embodiments, the multi-order query result system integrates computer software applications from third-party applications. For example, the multi-order query result system can integrate applications such as photo applications, calendar applications, rideshare services, flight booking services, browser histories, email services, stored content items, hotel services, and organizational ontologies. In particular, the integration of third-party applications allows for the multi-order query result system to provide a personalized contextual search engine for an individual. Furthermore, in some embodiments, the multi-order query result system links its contextual orchestration engine within a content management system. For instance, the multi-order query result system links to video transcription query engines, expert identification engines, and/or other internal contextual search engines.

As suggested above, the multi-order query result system can provide several improvements or advantages over existing video editing systems. For example, the multi-order query result system can provide improved flexibility over existing systems. While many existing systems are limited to generating responses to single-order queries, the multi-order query result system can adapt to multi-order queries. For example, the multi-order query result system overcomes limitations of prior systems by generating from a multi-order text query a first context-defining query subcomponent that indicates a first contextual data source for responding to the first context-defining query subcomponent. Further, the multi-order query result system generates a first result by utilizing computer code specific to the first contextual data source and executable for responding to the first context-defining query subcomponent. Moreover, the multi-order query result system identifies a second result to a second context-defining query subcomponent generated from the multi-order text query. The multi-order query result system can further utilize the first result and the second result to generate an aggregated result in response to the multi-order text query.

Due at least in part to improving flexibility over prior video editing systems, the multi-order query result system can also improve accuracy. To elaborate, the multi-order query result system can accurately generate responses to multi-order text queries. For example, by generating multiple context-defining query subcomponents (e.g., breaking down the multi-order text query into manageable components), the multi-order query result system accurately generates an aggregated result response to the multi-order text query. In particular, each context-defining query subcomponent also results in a corresponding computer code that is executable for responding to each context-defining query subcomponent. As such, the multi-order query result system accurately responds to multi-order text queries.

In addition, the multi-order query result system further improves accuracy by integrating various contextual data sources. For example, the multi-order query result system can adapt to specific contextual data sources of a user account, including account-specific contextual data sources, organizational contextual data sources (e.g., a company/organization ontology), and/or application-specific contextual data sources. The multi-order query result system can accordingly generate accurate responses for individual user accounts by generating and executing computer code that is specific (e.g., contextualized) to the contextual data sources indicated by and/or specific to a user account. For instance, depending on the context of the search (e.g., organizational, or personal), the multi-order query result system accurately generates a result due to its access to the various contextual data sources of a user account.

As illustrated by the foregoing discussion, the present disclosure utilizes a variety of terms to describe features and benefits of the multi-order query result system. Additional detail is hereafter provided regarding the meaning of these terms as used in this disclosure.

As mentioned above, the multi-order query result system generates a first context-defining query subcomponent from a multi-order text query. As used herein, a "multi-order text query" means a non-first order text query. For example, the multi-order text query includes multiple context defining query subcomponents. For instance, a query such as "who have I spent the most time with this month?" includes multiple subcomponents. To illustrate, this example query includes the following subcomponents: 1) determining basic details of the user making the query; 2) all meetings attended by the user in the past month; 3) all attendees of each meeting in the last month; and 4) other subcomponents to determine a combination of the aforementioned subcomponents (e.g., aggregating results of the first few components and selecting a person that matches the multi-order text query).

The multi-order query result system generates the first context-defining query subcomponent from the multi-order text query. As used herein, a "query subcomponent," "sub-component," or "component" means a subpart of a multi-order text query defined by a context. In some examples, each component broken down by the multi-order query result system indicates a contextual data source. For instance, the first context-defining query subcomponent indicates a first contextual data source.

As used herein, a "contextual data source" relates to a location or system that contains data. In particular, contextual data sources include databases, native applications, web applications, spreadsheets, files, websites, browsers, online platforms, and other sources of structured and unstructured data. For instance, contextual data sources include structured and unstructured data that support various applications utilized on computing devices. Accordingly, contextual data sources can include both internal or external data on an organizational level, a personal level, or an application level.

As mentioned previously, the multi-order query result system provides the first context-defining query subcomponent to a large language model. As used here in, a "large language model" refers to models capable of processing and generating natural language text. In particular, large language models are trained on large amounts of data to learn patterns and rules of language. As such, large language models post-training can generate text similar in style and content to input data. Examples of large language models include BLOOM, Bard AI, LaMDA, or DialoGPT. In some embodiments, large language models can include models considered to include artificial intelligence features.

As mentioned, the multi-order query result system provides the first context-defining query subcomponent to the large language model for generating computer code. As used herein, "computer code" refers to a set of instructions written in a programming language that a computing device can interpret and execute to perform a specific task. In particular, computer code includes a series of statements and functions that execute specific operations. Further, computer code includes statements written in specific syntax and translatable into machine code to be executed by a computing device. Accordingly, the multi-order query result system generates computer code that corresponds to a contextual data source. For instance, the multi-order query result system generates computer code specific to the contextual data source and executable for responding to a specific context-defining query subcomponent.

As also mentioned previously, the multi-order query result system utilizes domain-specific computer code. As alluded to in the last paragraph, domain-specific computer code refers to computer code specific to a contextual data source. As such, domain-specific computer code indicates the computer code is tailored specific to the context-defining subcomponent and the specific contextual data source corresponding with the context-defining subcomponent.

As mentioned, the multi-order query result system executes the computer code for generating a first result to the first context-defining query subcomponent of the multi-order text query. As used herein, a "result" refers to the multi-order query system generating an evaluation or performing an action. In some instances, multi-order text queries cause the multi-order query result system to make a determination such as who the boss is of an employee. In some instances, multi-order text queries cause the multi-order query result system to perform an action such as sending an email to a specific email address.

As just mentioned, in some examples, the result includes the multi-order query result system performing an action. As used herein, an "action" includes executing programs, activating functions within programs, or causing an application to input or output data. In particular, the action may cause an event to occur such as scheduling a calendar event, sending an email, sending a message, extracting a file from a content management system, booking a flight, booking a hotel, booking a ridesharing vehicle, and other actions performed by applications.

In addition to generating a result, the multi-order query result system generates an aggregated result. For example, the aggregated result includes multiple results. In particular, for each context-defining query subcomponent the multi-order query result system generates a result. Moreover, the multi-order query result system utilizes each generated result to generate an aggregated result to the multi-order text query. Thus, for multi-order text queries, the multi-order query result system combines the generated results to form the aggregated result.

As part of generating an aggregated result, the multi-order query result system can also provide a response to a client device. As used herein, a "response" includes data (e.g., visual data or audible data) presented on a client device associated with the multi-order query. In particular, the response includes an indication of an aggregated result. For instance, the multi-order query result system provides for display on a graphical user interface of the client device the response that indicates the aggregated result.

Moreover, in one or more embodiments, the multi-order query result system provides sample data to a large language model. For example, the multi-order query result system receives a request from a large language model for sample data. As used herein, "sample data" includes an example of a multi-order query, subcomponents of the multi-order query and executable computer code. For instance, the multi-order query result system receives the request for sample data in response to the large language model being unable to respond to a multi-order text query. As such, the multi-order query result system providing sample data to the large language model allows for the large language model to determine the subcomponents and executable computer code for similar multi-order text queries. Furthermore, the multi-order query result system utilizes sample data to train a large language model to identify and break down a multi-order text query into manageable subcomponents. Additionally, the multi-order query result system provides the sample data to a large language model to further train the large language model to generate computer code specific to various subcomponents in response to receiving a multi-order text query.

As mentioned above, the multi-order query result system integrates various applications. As used herein, an "application" refers to a computer program, or a set of computer programs, designed to perform specific functions or set of functions. In particular, applications typically allow for computer communication with other applications or computer systems via an application program interface (i.e., API). As mentioned above, an application may be a native application or a web-based application designed to perform specific tasks or functions.

Further, as also mentioned, the multi-order query result system integrates applications from an organizational ecosystem. For example, an "organizational ecosystem" includes a computer system or systems associated with an entity composed of multiple individuals or multiple groups. In particular, within an organizational ecosystem various types of software applications are utilized. Thus, the organizational ecosystem includes all software applications utilized within a particular organization. In addition, the multi-order query result system integrates third-party applications. For example, third-party applications include computer programs or software components developed by entities not within an organization. In particular, third-party applications include for example, calendar applications, messaging applications, ridesharing applications, hotel applications, airline applications, and photo applications.

Additionally, as used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents. digital images, digital videos, or digital audio files). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

Moreover, as used herein, the term "application session" (or sometimes simply "session") refers to an instance of use within a client application. For example, an application session refers to a set of activities performed within a single login of a client application or an application of a content management system. As another example, an application session refers to a set of activities performed within a single visit of an application or a single access of a content item. In some cases, a session requires a login (and thus different logins can separate different sessions) while in other cases, a session does not require a login and instead indicates an instance of use between closures or terminations (of an application or webpage) or between visits that are at least a threshold period of time apart (or separated by a device power off or sleep mode).

Additional detail regarding the multi-order query result system will now be provided with reference to the figures. For example, FIG. 1 illustrates a schematic diagram of an example system environment for implementing a multi-order query result system 102 in accordance with one or more implementations. An overview of the multi-order query result system 102 is described in relation to FIG. 1. Thereafter, a more detailed description of the components and processes of the multi-order query result system 102 is provided in relation to the subsequent figures.

As shown, the environment includes server(s) 104, a database 114, server(s) 116 with a large language model 118, and a client device 108. Each of the components of the environment can communicate via the network 112, and the network 112 may be any suitable network over which computing devices can communicate. Example networks are discussed in more detail below in relation to FIGS. 13-14.

As mentioned above, the example environment includes client device 108. The client device 108 can be one of a variety of computing devices, including a smartphone, a tablet, a smart television, a desktop computer, a laptop computer, a virtual reality device, an augmented reality device, or another computing device as described in relation to FIGS. 13-14. The client device 108 can communicate with the server(s) 104 via the network 112. For example, the client device 108 can receive user input from a user interacting with the client device 108 (e.g., via the client application 110) to, for instance, access, generate, modify, or share a multi-order response to a multi-order text query, or to select user interface elements for interacting with the content management system 106 (e.g., for indicating contextual data sources). In addition, the multi-order query result system 102 on the server(s) 104 can receive information relating to various interactions with content items and/or user interface elements based on the input received by the client device 108.

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface for interacting with (or collaborating regarding) generating multi-order query responses. Using the client application, the client device 108 can perform (or request to perform) various operations, such as indicating a contextual data source and/or generating a response to multi-order text query.

As illustrated in FIG. 1, the example environment also includes the server(s) 104. The server(s) 104 may generate, track, store, process, receive, and transmit electronic data, such as multi-order text queries, results, actions, determinations, responses, query-component-specific computer code, interactions with interface elements, and/or interactions between user accounts or client devices. For example, the server(s) 104 may receive an indication from the client device 108 of a user interaction defining a multi-order text query. In addition, the server(s) 104 can transmit data to the client device 108 in the form of a response to a multi-order text query. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, container orchestration servers, communication servers, web-hosting servers, machine learning server, and other types of servers.

As shown in FIG. 1, the server(s) 104 can also include the multi-order query result system 102 as part of a content management system 106. The content management system 106 can communicate with the client device 108 to perform various functions associated with the client application 110 such as managing user accounts, defining multi-order text queries, and/or designating contextual data sources. Indeed, the content management system 106 can include a network-based smart cloud storage system to manage, store, and maintain content items and related data across numerous user accounts. In some embodiments, the multi-order query result system 102 and/or the content management system 106 utilize the database 114 to store and access information such as content items, contextual data sources, multi-order text queries, results for multi-order text queries, responses to multi-order text queries, and other information.

As further illustrated, the environment includes the server(s) 116 that hosts the large language model 118. In particular, the large language model 118 communicates with the server(s) 104, the client device 108, and/or the database 114. For example, the multi-order query result system 102 provides domain-specific language segments to the large language model 118, where the domain-specific language segments indicate contextual data sources for generating results for various query subcomponents. Indeed, the large language model 118 can include a machine learning model powered by neural networks or other machine learning architectures for generating responses to text queries. For example, the large language model 118 can refer to a ChatGPT model that generates computer-executable code segments for accessing contextual data sources to generate responses for query subcomponents.

Although FIG. 1 depicts the multi-order query result system 102 located on the server(s) 104, in some implementations, the multi-order query result system 102 may be implemented by (e.g., located entirely or in part on) one or more other components of the environment. For example, the multi-order query result system 102 may be implemented by the client device 108 and/or a third-party system. For example, the client device 108 and/or a third-party system can download all or part of the multi-order query result system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the multi-order query result system 102, bypassing the network 112. The environment may also include one or more third-party systems, each corresponding to a different contextual data source. In addition, the environment can include the database 114 located external to the server(s) 104 (e.g., in communication via the network 112) or located on the server(s) 104 and/or on the client device 108. In some cases, the server(s) 104 and/or the client device 108 can host or house all or part of the large language model 118.

Figure 2A:
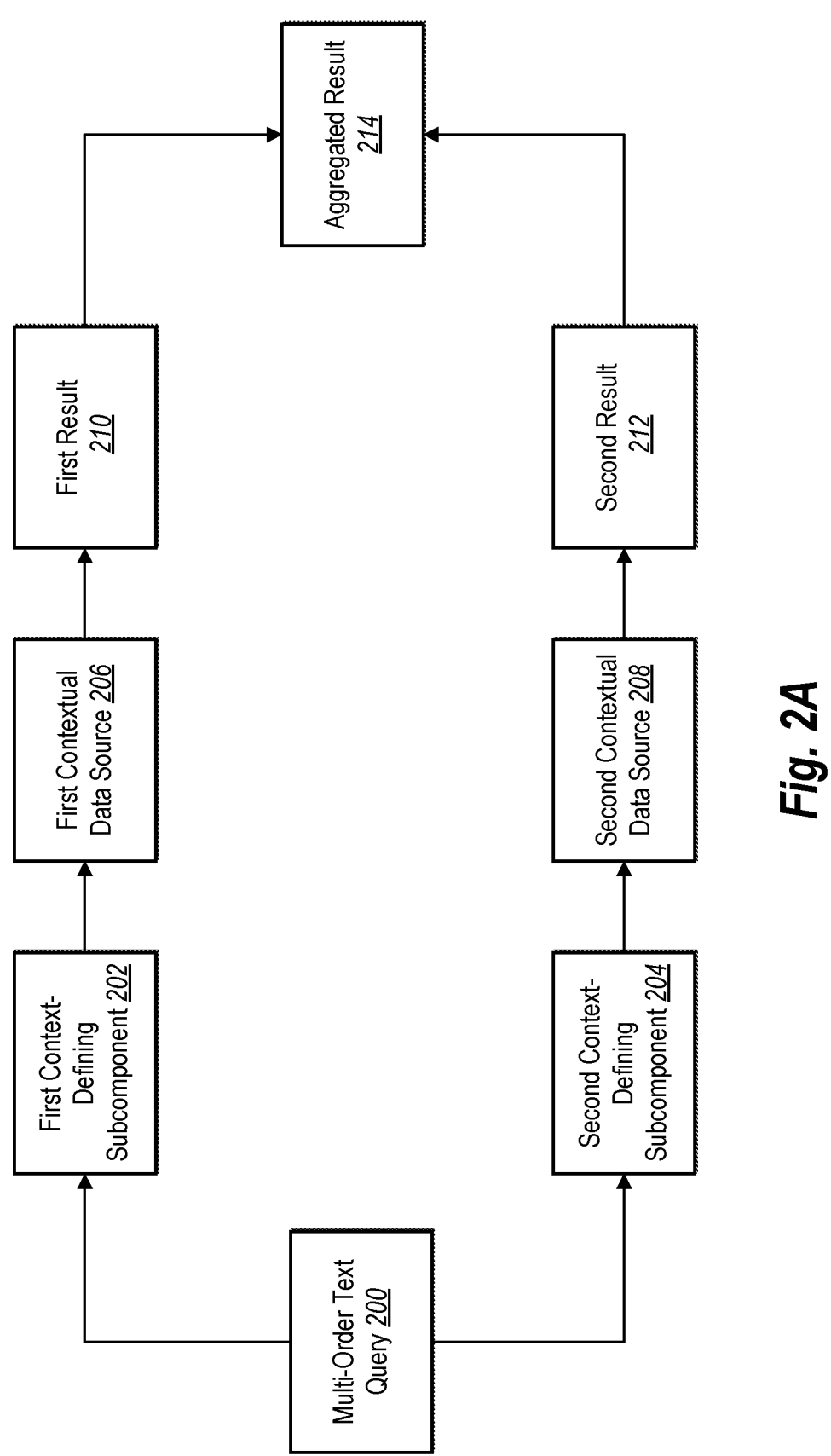
FIGS. 2A-2B illustrate example overviews of the multi-order query result system generating an aggregated result for a multi-order text query using a context orchestration engine in accordance with one or more embodiments.

FIG. 2A illustrates an overview of the multi-order query result system 102 generating an aggregated result in accordance with one or more embodiments. For example, FIG. 2 shows the multi-order query result system 102 generating an aggregated result response to a multi-order text query. Additional detail regarding the various acts illustrated in FIG. 2 is provided thereafter with reference to subsequent figures.

As illustrated, FIG. 2A shows the multi-order query result system 102 processing a multi-order text query 200, which was discussed above. For example, a user of a client device creates or generates the multi-order text query 200 via text generation or by speaking into a microphone of the client device. In particular, the multi-order query result system 102 receives and processes the generated text query or the voice query. For the voice query, the multi-order query result system 102 processes the voice query to transform it into a text query). For instance, in response to receiving the multi-order text query 200, the multi-order query result system 102 activates processes for breaking down the multi-order text query 200.

As further shown, FIG. 2A illustrates the multi-order query result system 102 breaking down the multi-order text query 200. For example, FIG. 2A shows the multi-order query result system 102 generating a first context-defining query subcomponent 202 and a second context-defining query subcomponent 204. In particular, the multi-order query result system 102 generates the first context-defining query subcomponent 202 and the second context-defining query subcomponent 204 by identifying different sub-portions of the multi-order text query 200. For instance, the multi-order query result system 102 provides the multi-order text query 200 to a large language model which identifies various subcomponents of the multi-order text query 200 based on previously received sample data. Specifically, the multi-order query result system 102 trains the large language model on sample data to identify different subcomponents as part of the multi-order text query 200.

Moreover, FIG. 2A illustrates the context defining subcomponents indicating a different data source, which was already discussed above. For example, FIG. 2A illustrates the first context-defining query subcomponent 202 indicating a first contextual data source 206 and the second context-defining query subcomponent 204 indicating a second contextual data source 208. In particular, the multi-order query result system 102 executes computer code specific to each contextual data source to generate a result.

As shown, FIG. 2A shows the multi-order query result system 102 generating a first result 210 and a second result 212, which was discussed above. For example, the multi-order query result system 102 generates the first result 210 by executing computer code specific to the first contextual data source 206 and generates the second result 212 by executing computer code specific to the second contextual data source 208. In particular, the first result 210 responds to the first context-defining query subcomponent 202 and the second result 212 responds to the second context-defining query subcomponent 204.

Furthermore, FIG. 2A also illustrates the multi-order query result system 102 generating an aggregated result 214, which was discussed previously. For example, FIG. 2A shows the multi-order query result system 102 generating the aggregated result 214 by combining the first result 210 and the second result 212. In particular, the aggregated result 214 responds to the multi-order text query.

Figure 2B:
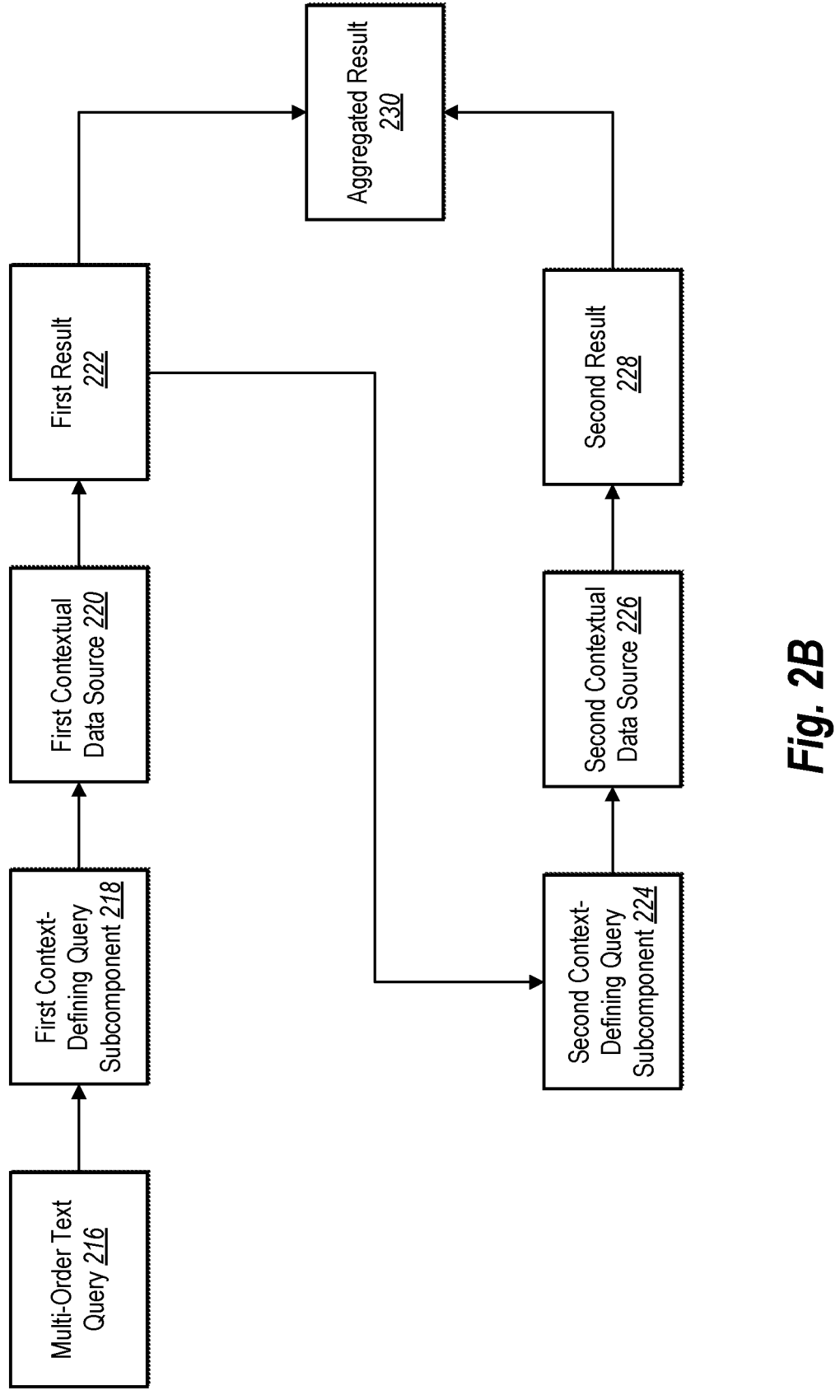

FIG. 2B also illustrates an overview of the multi-order query result system 102 generating an aggregated result in accordance with one or more embodiments. For example, FIG. 2B similar to FIG. 2A shows a multi-order text query 216. As already discussed in FIG. 2A and similarly shown in FIG. 2B, the multi-order query result system 102 generates a first context-defining query subcomponent 218 which indicates a first contextual data source 220 and generates a first result 222.

In contrast to FIG. 2A, FIG. 2B shows the multi-order query result system 102 feeding the first result 222 to a second context-defining query subcomponent 224 generated by the multi-order query result system 102 from the multi-order text query 216. Specifically, the multi-order query result system 102 generates the second context-defining query subcomponent 224 based on the first result 222, the second context-defining query subcomponent 224 indicating a second contextual data source 226. Moreover, FIG. 2B shows the multi-order query result system 102 generating a second result 228 from the second contextual data source 226. Additionally, based on the first result 222 and the second result 228, the multi-order query result system 102 generates an aggregated result 230.

In other words, as shown, the multi-order query result system 102 utilizes the output for the first context-defining query subcomponent 218 as input for generating an output for a subsequent subcomponent. For instance, computer code for a subsequent step may call or rely on the output generated by a previous subcomponent. As shown, the multi-order query result system 102 utilizes the first result 222 to generate the second result 228.

Figure 3:
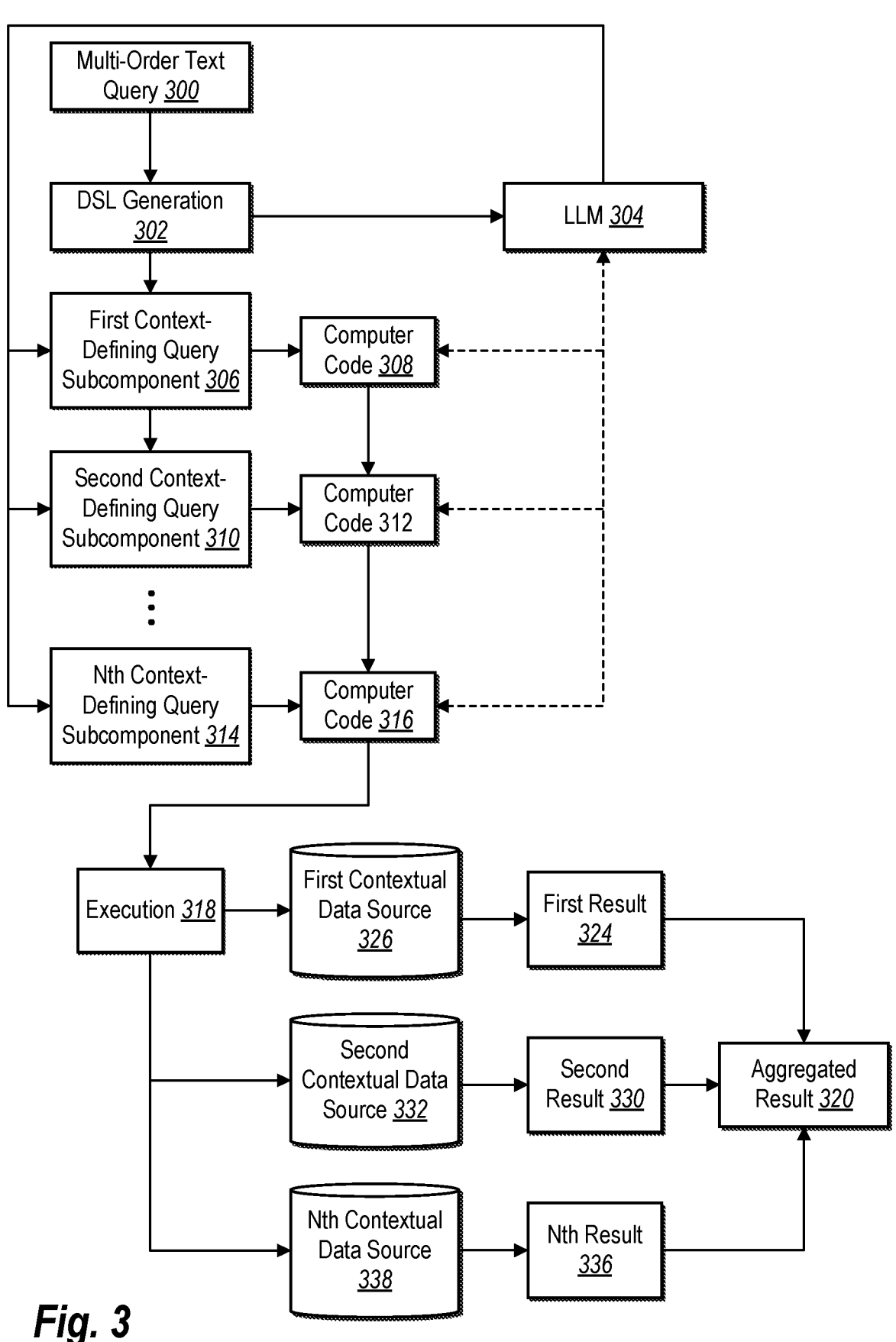
FIG. 3 illustrates an example architecture diagram for the multi-order query result system breaking down a multi-order text query and executing computer code in accordance with one or more embodiments.

FIG. 3 illustrates additional details regarding the multi-order query result system 102 generating various subcomponents and executing computer code to generate an aggregated result in accordance with one or more embodiments. In particular, the multi-order query result system can utilize a contextual orchestration engine to generate a response to a multi-order text query. For instance, as alluded to above, the contextual orchestration engine aspect includes the multi-order query result system breaking down the multi-order text query and generating computer code specific to a corresponding contextual data source.

As illustrated in FIG. 3, the multi-order query result system 102 receives a multi-order text query 300 from a client device (e.g., the client device 108). In response to receiving the multi-order text query 300, the multi-order query result system 102 utilizes a domain-specific-language generator 302 (e.g., as a container or a component of a contextual orchestration engine) to generate domain-specific-language from the multi-order text query. Specifically, the multi-order query result system 102 provides the generated domain-specific language from the multi-order text query to a large language model 304. For instance, in some embodiments, the multi-order query result system 102 utilizes the large language model 304 to receive the domain-specific language from the multi-order text query which subsequently identifies or extracts multiple steps (e.g., subcomponents) from the multi-order text query. The multi-order query result system 102 then receives the identified or extracted steps (e.g., subcomponents) from the large language model 304 (e.g., the large language model identifies and extracts subcomponents from the multi-order text query 300). Furthermore, the multi-order query result system 102 passes the received subcomponents back to the large language model 304 for generating computer code, which is discussed in more detail below.

In some embodiments, the multi-order query result system 102 determines, detects, or identifies different context-defining query subcomponents that each require their own action and/or contextual data source for responding. The multi-order query result system 102 further applies the domain-specific-language generator 302 to generate domain-specific language for each of the query subcomponents. Indeed, the multi-order query result system 102 identifies or extracts multiple steps (e.g., step 1, step 2, . . . , step N) from the multi-order text query 300, where each of the different steps have different context and/or each require different actions. In some cases, the multi-order query result system 102 generates a separate domain-specific language segment for (e.g., that represents or defines) each of the steps. Each domain-specific language component can define its own step or action corresponding to its own contextual data source as a sub-part to answering the whole multi-order text query.

The multi-order query result system 102 further provides the different domain-specific language segments (e.g., of each subcomponent of the multi-order text query 300) to the large language model 304 (e.g., either by providing the entire multi-order text query or by providing the subcomponents). Indeed, the multi-order query result system 102 provides the different domain-specific language segments to the large language model 304 trained (with other domain-specific language examples) to generate results for each of the different steps. For instance, FIG. 3 shows a first context-defining query sub-component 306 as a first step, a second context-defining query subcomponent 310 as a second step, and an Nth context-defining subcomponent 314 as the Nth step. Specifically, the large language model 304 generates computer code corresponding to each step, or from each of the domain-specific language segments of the context defining subcomponents. Accordingly, the multi-order query result system 102 generates a computer code 308 for the first step, a computer code 312 for the second step, and a computer code 316 for the Nth step. In particular, the multi-order query result system 102 utilizes the large language model 304 to generate the computer code for each step that corresponds with a context-defining subcomponent.

As further illustrated in FIG. 3, the multi-order query result system 102 executes computer code to generate an aggregated result 320 to the multi-order text query in accordance with one or more embodiments. In particular, the multi-order query result system 102 generates each of the computer code segments corresponding to each context-defining query subcomponent (e.g., for each step). As shown, the multi-order query result system 102 performs an act 318 of executing computer code segments to perform events for each of the defined steps. Indeed, for each step, the multi-order query result system 102 accesses a particular contextual data source as designated by the computer code executed to perform the step.

For example, FIG. 3 shows the multi-order query result system 102 executing the computer code 308 for the first step, computer code 312 for the second step, and computer code 316 for the Nth step. In particular, to generate a first result 324 in response to the first context-defining query subcomponent 306, the multi-order query result system 102 accesses a first contextual data source 326. Further, to generate a second result 330 in response to the second context-defining query subcomponent 310, the multi-order query result system 102 accesses a second contextual data source 332. Likewise, to generate an Nth result 336, the multi-order query result system 102 accesses an Nth contextual data source 338. The multi-order query result system 102 aggregates the first result 324, the second result 330, and the Nth result 336 to generate the aggregated result 320. As will be explained further below, in some embodiments, the multi-order query result system 102 uses a result from a particular query subcomponent as input to finding an additional result. Accordingly, while the aggregated result 320 can be a combination of the first result 324, the second result 330, and the Nth result 336, in other examples the aggregated result 320 is a final result that is based on the previous results from each of the query subcomponents 306-314.

As mentioned previously, FIGS. 4A-4B illustrate example context-defining query subcomponents of a multi-order text query in accordance with one or more embodiments. For example, FIG. 4A shows a multi-order text query 400. In particular, the multi-order text query 400 reads "when am I meeting with my boss next?" For instance, utilizing the processes described above in FIGS. 2A-3, the multi-order query result system 102 generates various context-defining query subcomponents.

As shown in FIG. 4A, the multi-order query result system 102 generates a first context-defining query subcomponent 402 which corresponds with a first step of the multi-order text query 400. Specifically, the first context-defining query subcomponent 402 indicates a query type with context relating to the basic details of the user. Further, output relating to the first context-defining query subcomponent

402 indicates the name of the employee and the employee type/category. Further, FIG. 4A also shows a second context-defining query subcomponent 404. In particular, the multi-order query result system 102 in the second context-defining query subcomponent 404 determines the manager of the user in context of the organization that the user is part of.

In addition to the first and second context-defining query subcomponents, FIG. 4A also shows a third context-defining query subcomponent 406 and a fourth context-defining query subcomponent 408. Specifically, for the third context-defining query subcomponent 406, the multi-order query result system 102 determines the next meeting scheduled with the user (e.g., employee) and the user's manager. Accordingly, as previously discussed, in this context the multi-order query result system 102 utilizes the result from the first context-defining query subcomponent 402 and the second context-defining query subcomponent 404 to determine the third context-defining query subcomponent 406. Moreover, FIG. 4A shows the fourth context-defining query subcomponent 408 as aggregating the previous results from the other context-defining query subcomponents.

FIG. 4B illustrates the multi-order query result system 102 receiving a multi-order text query 410 different from the multi-order text query shown in FIG. 4A. For example, FIG. 4B shows the multi-order text query 410 that reads "schedule a meeting with the internal expert in Generative LLM topic." In particular, the multi-order text query 410 shown in FIG. 4B includes a user requesting an action to be performed by the multi-order query result system 102.

As further shown, FIG. 4B shows a first context-defining query subcomponent 412. Similar to FIG. 4A, the first context-defining query subcomponent 412 includes determining basic details of the user making the query. In contrast to FIG. 4A, a second context-defining query subcomponent 414 shows a determination within an organizational context of an internal expert in generative LLM. Further, FIG. 4B shows a third context-defining query subcomponent 416 that determines within a calendar context available time slots for the user making the query and the identified expert. Moreover, a fourth context-defining query subcomponent 418 performs an action of selecting an expert and an available time. Additionally, a fifth context-defining query subcomponent 420 includes the multi-order query result system 102 creating the calendar invitation with the identified user and expert at a preferred time slot. For instance, the fifth context-defining query subcomponent 420 is the aggregated result generated by the multi-order query result system 102. Thus, the action of creating the calendar invite with the identified user and expert at a preferred time slot includes a first action that indicates a component-specific action within a specific contextual data source.

FIGS. 4C-4D illustrate the multi-order query result system 102 generating computer code to execute for generating results responsive to various context-defining subcomponents in accordance with one or more embodiments. For example, FIG. 4C shows computer code for executing a task of obtaining the next meeting time a user has with another employee. In particular, for the example given in FIG. 4A, the computer code shown in FIG. 4C relates to determining the next meeting time with the user's boss. As mentioned above, the multi-order query result system 102 provides the multi-order text query or a context-defining query subcomponent to a large language model which generates computer code specific to that context-defining query subcomponent. As another example, FIG. 4D shows additional computer code for determining all meetings attended by the querying user within the past month. In particular, the computer code shown in FIG. 4D determines the current month, the month prior to the current month, and all meetings attended in the identified month.

FIGS. 4A-4D show various examples of multi-order text queries being broken down into various context-defining query subcomponents and computer code that corresponds to the multi-order text queries. Although not shown in FIGS. 4A-4D, in one or more embodiments, the multi-order query result system provides sample data that includes FIGS. 4A-4D. In particular, the multi-order query result system provides the sample data shown in FIGS. 4A-4D to a large language model. As mentioned above, the multi-order query result system utilizes the sample data to train large language models to accurately generate results in response to multi-order text queries. For instance, the multi-order query result system provides millions of sample data (e.g., such as the ones shown in FIGS. 4A-4D) to train a large language model on the most utilized multi-order text queries. Due to the nature of large language models, the multi-order query result system does not need to provide exhaustive sample data. Specifically, the multi-order query result system provides generalized sample data in which the large language model is able to infer variations and deviations from the provided sample data.

Figure 5:
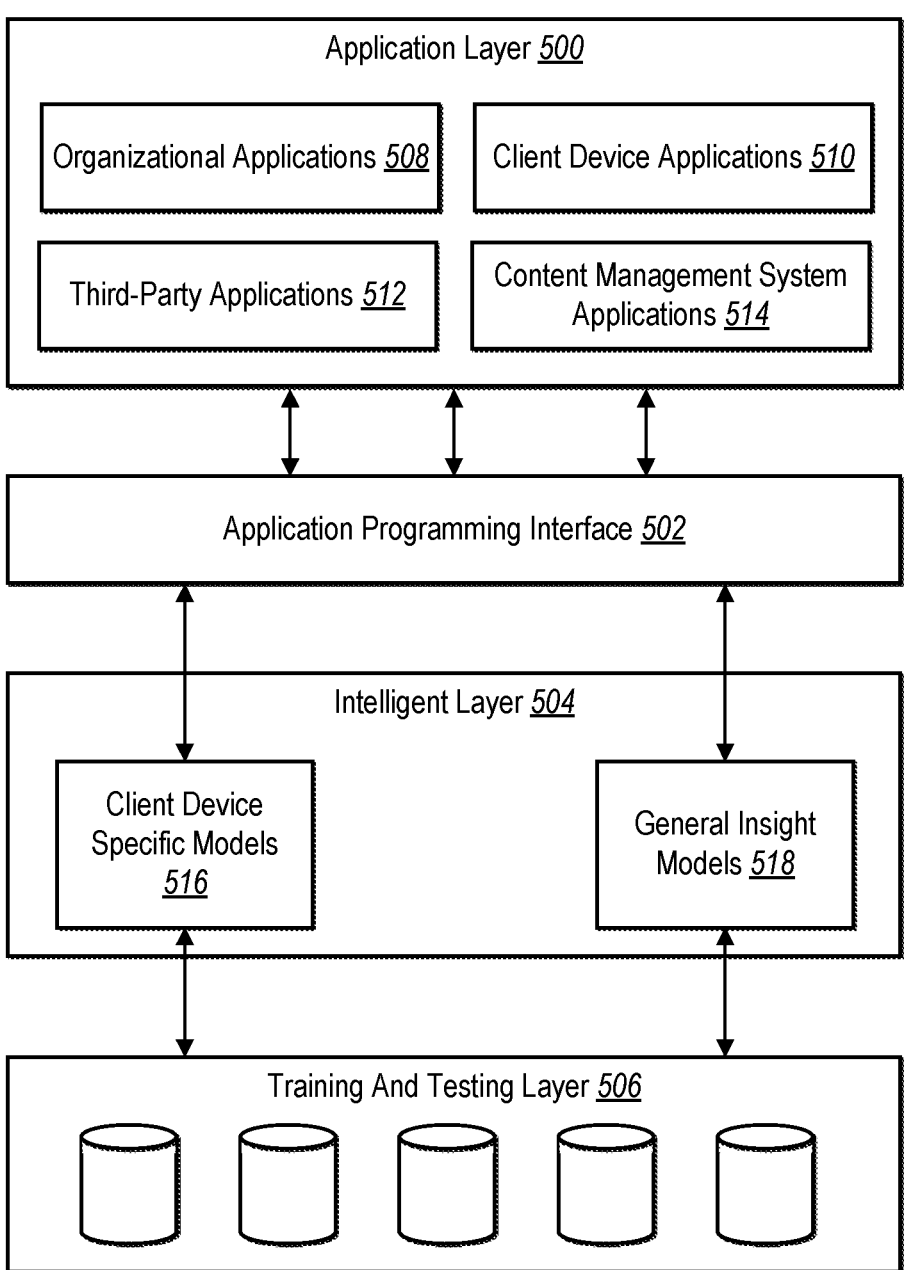
FIG. 5 illustrates an example diagram of the multi-order query result system implemented on a client device level and a general environment level and interactions of the multi-order query result system with an application layer in accordance with one or more embodiments.

FIG. 5 illustrates an example architecture diagram for a contextual orchestration engine of the multi-order query result system 102 in accordance with one or more embodiments. Indeed, as mentioned, the multi-order query result system 102 utilizes a contextual orchestration engine to generate a result to a multi-order text query. In particular, FIG. 5 illustrates implementing the multi-order query result system 102 for receiving multi-order text queries and generating results to the multi-order text queries. As shown, a contextual orchestration engine of the multi-order query result system 102 can include various architectural components, including an applications layer 500, an application programming interface (hereinafter API 502), an intelligence layer 504, and a training and testing layer 506.

As shown, the applications layer 500 contains various types of software applications. For example, FIG. 5 shows organizational applications 508, client device applications 510, third-party applications 512, and content management system applications 514. In particular, each of the aforementioned applications further include application containers that house multiple applications within each application category. For instance, the multi-order query result system 102 houses applications and their corresponding contextual data sources for in-organization applications (e.g., applications built in-house) and out-of-organization applications (applications developed by third-parties but used within the organization).

As already mentioned, the applications layer 500 includes content management system applications 514. In particular, the content management system applications 514 include applications within the content management system 106. Accordingly, the multi-order query result system 102 implements the capabilities of generating results for multi-order text queries for applications of the content management system 106. More details relating to specific implementations of the multi-order query result system 102 within content management system applications 514 is given below in the description of FIGS. 8-10.

Additionally, FIG. 5 shows the application programming interface (API 502). For example, the API 502 includes a set of protocols, routines, and tools for building applications. In particular, the API 502 provides a method for various software components, applications, or systems to communicate and exchange data with one another, regardless of the type of programming language, operating system, or hardware platforms used for each application environment. For instance, the API 502 can include a set of rules that define the manner in which different software components interact, the format and structure of data exchange, the syntax and parameters of calls, and the methods for authentication. Specifically, the API 502 includes a prompt API layer for real-time data extraction, pre-processing, model selection, and formatting of prompts for further providing to the intelligence layer 504.

Indeed, as shown in FIG. 5, the multi-order query result system 102 includes the intelligence layer 504 for training a large language model (and/or other machine learning models) to generate results for context-defining query subcomponents (e.g., as formulated by the prompt API layer) of a multi-order text query. As shown, the intelligence layer 504 includes client device specific models 516. In other words, the client device specific models 516 include a fine-tuning layer that is fine-tuned/trained to generate computer code specific to the contextual data sources and/or multi-order text queries from a particular user account.

In one or more embodiments, the multi-order query result system 102 receives a multi-order text query and via the API 502 extracts a relevant sub-component of the multi-order text query and relevant data from the applications layer 500. In particular, based on extracting the subcomponent and the relevant data, the multi-order query result system 102 then generates tailored computer code for the extracted subcomponent based on the contextual data source corresponding with the relevant data.

Additionally, as shown, the intelligence layer 504 also includes general insight models 518. In other words, the general insight models 518 includes one or more foundational models trained/tuned for all user accounts. Indeed, the multi-order query result system 102 will be pretrained for some contextual data sources that are more universal and accessible by many user accounts (e.g., internet-based data sources). The multi-order query result system 102 will also be fine-tuned (e.g., via the fine tuning layer) on a user-account-specific basis to generate responses from contextual data sources that vary by user account (e.g., email accounts, calendars, or organizational ontologies).

Further, as shown in FIG. 5, the multi-order query result system 102 includes the training and testing layer 506. For example, as mentioned above, the multi-order query result system 102 is pretrained for some contextual data sources and fine-tuned based on specific contextual data sources. For instance, the training and testing layer 506 provides training of the client device specific models 516 and the general insight models 518 to generate accurate results to multi-order text queries. In particular, the multi-order query result system 102 may take or accept various inputs from the training and testing layer 506, such as: i) employee knowledge base, ii) employee desktop and browser activity, iii) employee communication, iv) employee calendar data, v) digital form signature data, vi) file sharing services, and/or vii) a third-party connector API.

Figure 6:
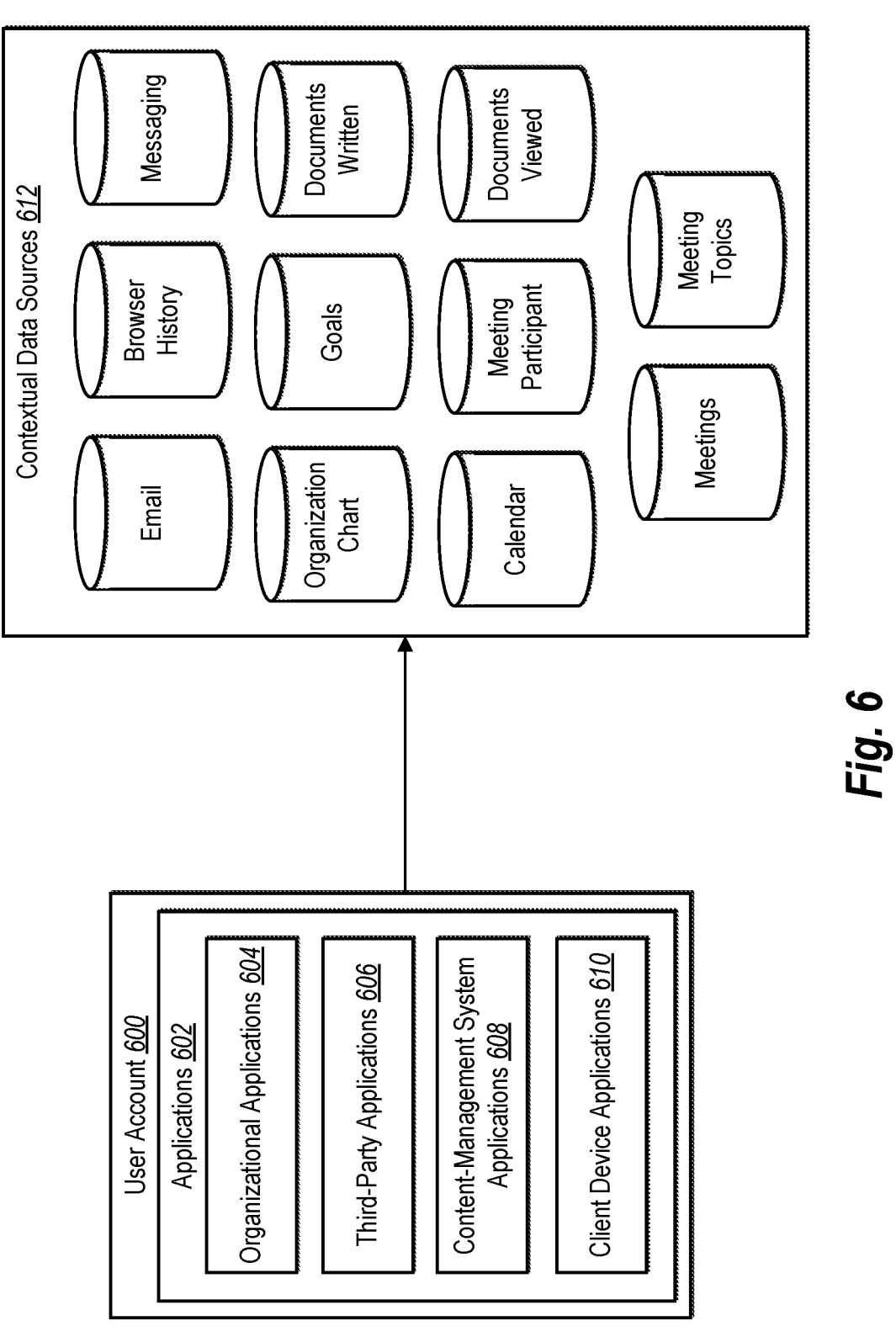
FIG. 6 illustrates an example diagram of the multi-order query result system drawing from a variety of contextual data sources in accordance with one or more embodiments.

FIG. 6 illustrates an example diagram of contextual data sources associated with a user account of the content management system 106 in accordance with one or more embodiments. As shown, the multi-order query result system 102 can identify, detect, or determine contextual data sources 612 associated with a user account 600. For instance, the multi-order query result system 102 can determine relevant applications integrated or indicated by a client device of the user account 600 to identify the contextual data sources 612.

For example, FIG. 6 shows the user account 600 including applications 602. In particular, the applications 602 further include organizational applications 604, third-party applications 606, content-management system applications 608, and client device applications 610. For instance, for each of the applications 602, the multi-order query result system 102 determines for the user account 600 a corresponding contextual data source. Furthermore, in addition to the multi-order query result system 102 determining a corresponding contextual data source for each application of the user account 600, the multi-order query result system 102 also can receive example domain-specific language and/or example computer code for accessing data stored within a given contextual data source for generating a result to a multi-order text query.

In some cases, the multi-order query result system 102 identifies or detects contextual data sources, such as a messaging data source storing messages and message data for a messaging service/application. Other contextual data sources (linked to a user account) include: i) an email application/service storing emails and email data, ii) stored content items and content item data (e.g., documents, images, videos, etc.) associated with a user account, iii) a browser history, iv) a meeting application/service storing meeting data for video and/or audio meetings, v) a calendar application/service storing calendar events and event data for a user account, vi) an organization chart or ontology defining user account relationships within an organizational hierarchy, vii) hotel applications/servers/databases, viii) rideshare applications/servers/databases, ix) airline applications/servers/databases, x) past decisions, xi) future goals, xii) social media applications/servers/databases, and/or xiii) user activity history within the content management system 106.

Figure 7:
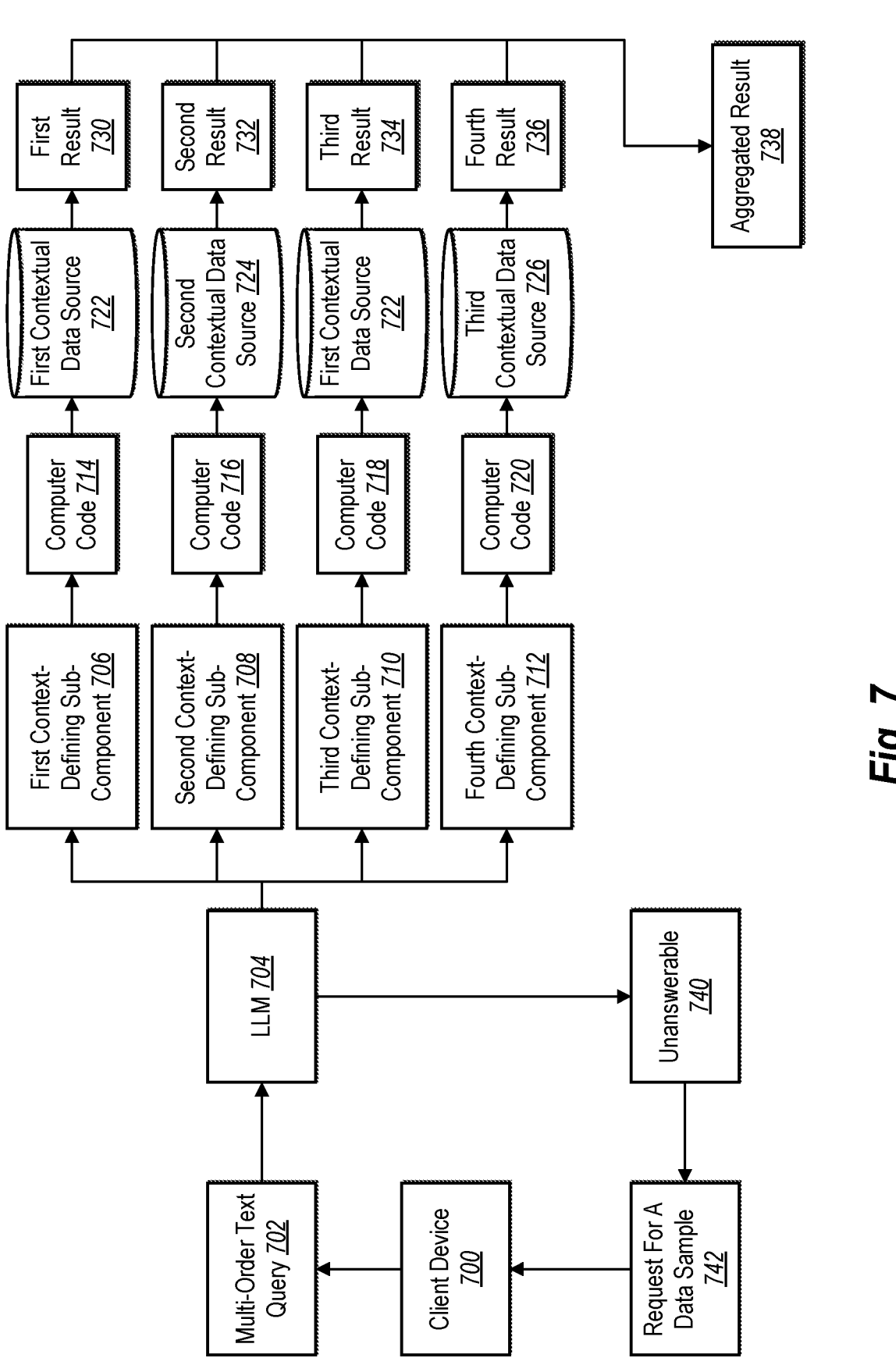
FIG. 7 illustrates an example diagram of the multi-order query result system receiving an unanswerable multi-order text query in accordance with one or more embodiments.

FIG. 7 illustrates an example flow diagram for generating an aggregated result from a multi-order text query in accordance with one or more embodiments. For example, FIG. 7 shows the multi-order query result system 102 receiving a multi-order text query 702 from a client device 700 and providing the multi-order text query 702 to a large language model 704, as previously discussed. Further, FIG. 7 shows the multi-order query result system 102 via the large language model 704 generating individual subcomponents of the multi-order text query 702, as also discussed previously. For instance, FIG. 7 shows computer code 714 of a first context-defining query subcomponent 706, computer code 716 of a second context-defining query subcomponent 708, computer code 718 of a third context-defining query subcomponent 710, and computer code 720 of a fourth context-defining query subcomponent 712.

Furthermore, in one or more embodiments, the multi-order query result system 102 can generate different subcomponents of the multi-order text query where some of the subcomponents point to the same contextual data source. In particular, as shown in FIG. 7, the multi-order query result system 102 generates a first result 730 corresponding to a first contextual data source 722, a second result 732 corresponding to a second contextual data source 724, a third result 734 corresponding to the first contextual data source 722 and a fourth result 736 corresponding to a third contextual data source 726. Moreover, FIG. 7 shows the multi-order query result system 102 generating an aggregated result 738 from a combination of the aforementioned results.

FIG. 7 also illustrates an example flow of receiving an unanswerable multi-order text query. For example, in response to the multi-order query result system 102 providing the multi-order text query to the large language model 704, the large language model 704 may perform an act 740. In particular, the act 740 includes making a determination that the multi-order text query 702 is unanswerable. For instance, the determination that the multi-order text query 702 is unanswerable can include the large language model 704 not understanding how to break the multi-order text query down into individual subcomponents. Further, the multi-order text query 702 being unanswerable also includes the multi-order query result system 102 having insufficient sample data for the particular query.

As was discussed above, in response to the multi-order query result system 102 determining the multi-order text query 702 as unanswerable, the multi-order query result system 102 sends a request. In particular, the multi-order query result system 102 sends a request 742 for a data sample to the client device 700, which was discussed above. For instance, the multi-order query result system 102 sends the request 742 to the client device 700 that reads "please send domain-specific language for each subcomponent of the multi-order text query."

Although not shown in FIG. 7, in one or more embodiments, the multi-order query result system 102 iteratively sends the request 742 to the client device 700 until reaching a determination that the multi-order text query 702 is answerable. In some embodiments, the multi-order query result system 102 determines that the large language model generates inaccurate or incomplete computer code for one or more steps (or does not generate computer code at all). For example, the multi-order query result system 102 receives an indication from the large language model that the model has not been trained to generate a particular code segment and/or does not have training for interacting with a particular contextual data source. Accordingly, the multi-order query result system 102 generates and provides a domain-specific-language example to provide to the large language model to train the large language model to generate code segments corresponding to the context-defining query subcomponent in question and/or for interacting with a particular contextual data source.

Figure 8:
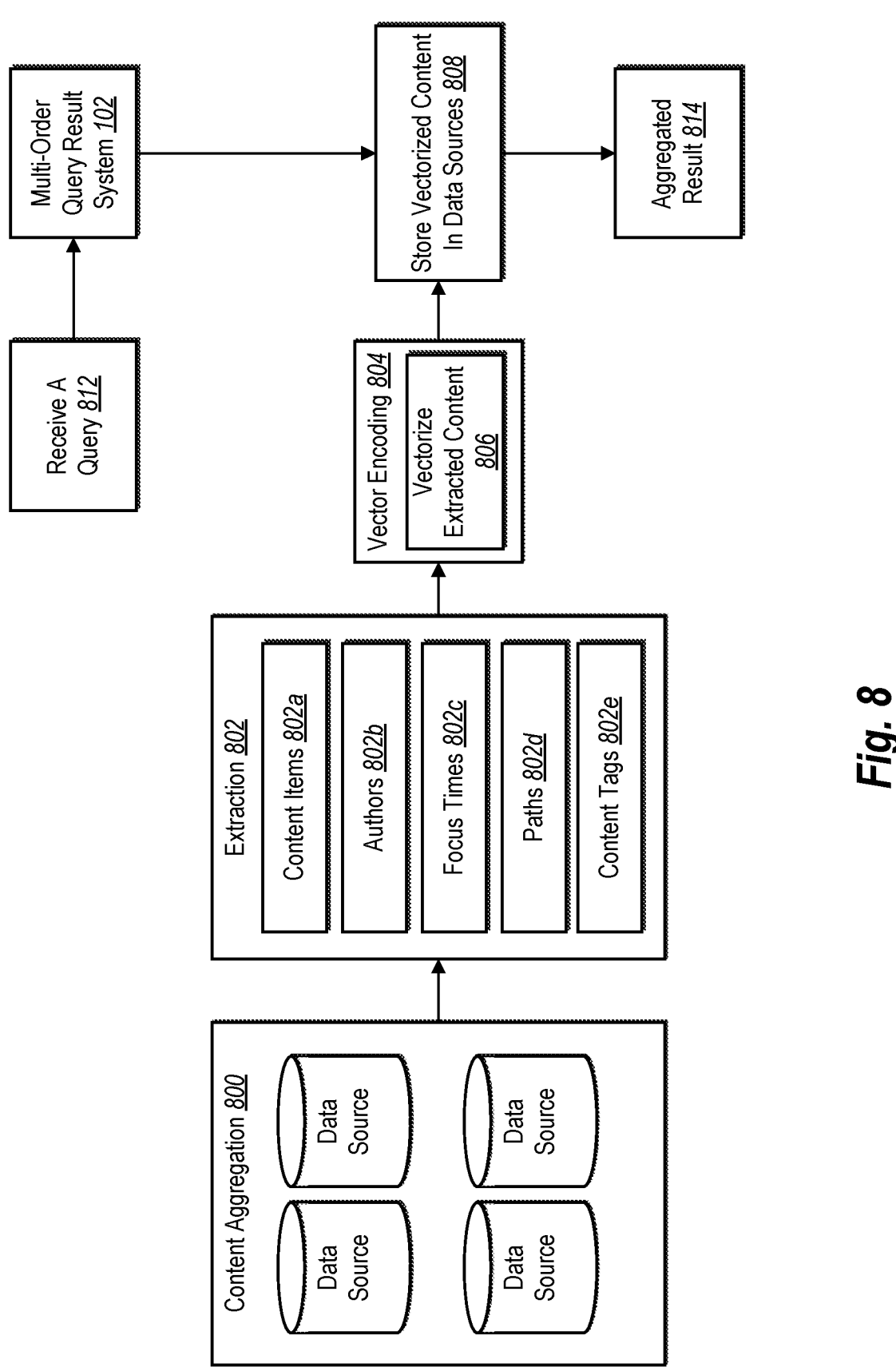
FIG. 8 illustrates an example diagram of implementing the multi-order query result system with an internal context search engine in accordance with one or more embodiments.

FIG. 8 illustrates the multi-order query result system 102 operating within an application of the content management system 106. For example, FIG. 8 shows the multi-order query result system 102 operating within an internal context engine that aggregates content from a user account and the user's colleagues. In particular, FIG. 8 shows the multi-order query result system 102 utilizing the internal context engine to perform an act 800 of content aggregation. For instance, the multi-order query result system 102 utilizes the internal context engine to aggregate content from multiple data sources.

In addition to performing the act 800, the multi-order query result system 102 also performs an act 802. Specifically, the act 802 includes extracting content from the aggregated content into specific containers. Any type of content can be extracted from the aggregated content. For instance, FIG. 8 shows the act 802 includes extracting content items 802*a*, authors 802*b*, focus times 802*c*, paths 802*d*, and content tags 802*e*. Moreover, each of the extracted categories allows the multi-order query result system 102 to utilize the context engine to make intelligent determinations.

Further, FIG. 8 shows the multi-order query result system 102 utilizing the context engine to perform an act 804 of vector encoding. In particular, the act 804 of vector encoding includes performing an act 806 of vectorizing extracted content. For instance, the multi-order query result system 102 utilizing the context engine places each of the extracted content categories in an embedding space for determining various relationships between extracted content. Further, as shown, the multi-order query result system 102 utilizes the context engine to perform an act 808 of storing the vectorized content in data sources. Specifically, the multi-order query result system 102 utilizes the stored vectorized content to make contextual recommendations, cluster topics together, and respond to queries relevant to the extracted content.

As mentioned above, the multi-order query result system 102 operates within the internal contextual engine. For example, FIG. 8 shows the multi-order query result system 102 receiving a query 812 and utilizing data sources that store the vectorized content. In particular, the multi-order query result system 102 draws from the data sources that store the vectorized content to generate an aggregated result 814. Thus, the multi-order query result system 102 operates within the internal context engine to provide additional accuracy and efficiency for users of client devices attempting to improve their workflow.

Figure 9:
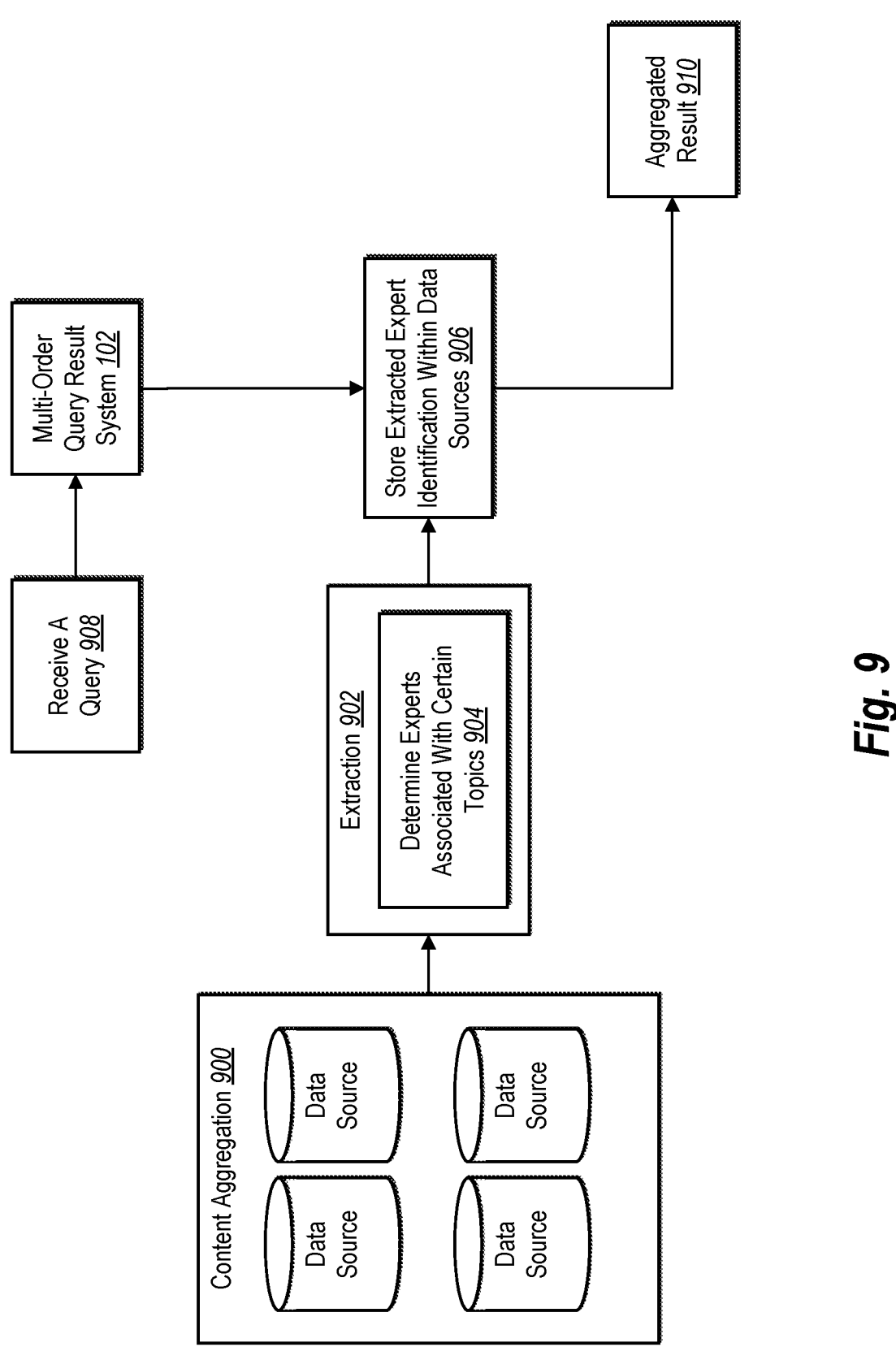
FIG. 9 illustrates an example diagram of implementing the multi-order query result system with an expert identification engine in accordance with one or more embodiments.

FIG. 9 shows the multi-order query result system 102 operating within an expert identification engine. For example, similar to FIG. 8, FIG. 9 shows the multi-order query result system 102 utilizing the expert identification engine to perform an act 900 of aggregating content. In particular, the multi-order query result system 102 utilizes the expert identification engine to aggregate content from multiple data sources. In addition to aggregating content, the multi-order query result system 102 also performs an act 902 of extraction. In particular, the act 902 includes an act 904 of the multi-order query result system 102 determining experts associated with certain topics. Moreover, the multi-order query result system 102 performs an act 906 of storing the extracted expert identification within data sources. Specifically, the multi-order query result system 102 accesses the data sources to further generate results in response to multi-order text queries.

As shown, FIG. 9 illustrates the multi-order query result system 102 receiving a query 908 and utilizing the data sources where expert identification information was stored. In particular, the multi-order query result system 102 utilizes the data sources to generate an aggregated result 910. For instance, the query 908 includes a query of "how do I apply for a corporate credit card?" The multi-order query result system 102 identifies experts associated with the topic of applying for a corporate credit card and generates the aggregated result 910 which identifies experts for the topic. Moreover, the multi-order query result system 102 can generate the aggregated result 910 which shows a list of experts ranked in order of expertise. In other instances, the aggregated result 910 shows a single expert.

Figure 10:
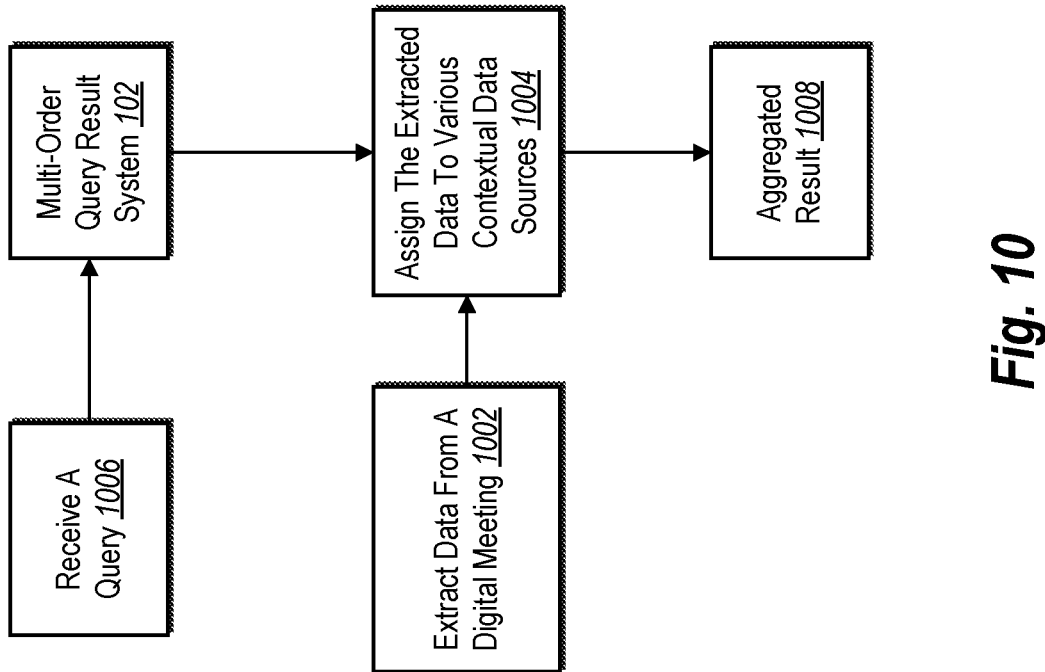
FIG. 10 illustrates an example diagram of implementing the multi-order query result system with a video transcription query engine in accordance with one or more embodiments.

FIG. 10 shows the multi-order query result system 102 operating within a video transcription query engine. For example, FIG. 10 shows an act 1002 of the multi-order query result system 102 utilizing the video transcription query engine to perform extraction. In particular, the multi-order query result system 102 utilizes the video transcription query engine to extract data from a digital meeting (e.g., a digital video call or a digital call). For instance, the multi-order query result system 102 utilizes the video transcription query engine to extract body language, the content of the meeting, and other cues present within the digital meeting. Specifically, the multi-order query result system 102 utilizes the video transcription query engine to extract action items discussed during the digital meeting, various participating members, the perspectives of participating members, topics, and other meeting related items.

Furthermore, FIG. 10 shows the multi-order query result system 102 utilizing the video transcription query engine to perform an act 1004 of assigning the extracted data to various contextual data sources. In particular, for content corresponding to action items, the multi-order query result system 102 utilizes the video transcription query engine to assign the action items to a contextual data source specific to digital meetings. In addition, FIG. 10 shows the multi-order query result system 102 receiving a query 1006. In response to receiving the query 1006, the multi-order query result system 102 utilizes the contextual data sources corresponding to the extracted data of the video transcription query engine to generate an aggregated result 1008.

As an example, if the query 1006 includes a question of "what are we supposed to do after today's meeting?" The multi-order query result system 102 utilizes the corresponding contextual data sources to generate a list of action items to do after the meeting held today and provides the aggregated result 1008 to the querying user. Accordingly, the multi-order query result system 102 operating within the video transcription query engine allows a user of a client device to receive answers to questions more accurately and effectively.

Figure 11:
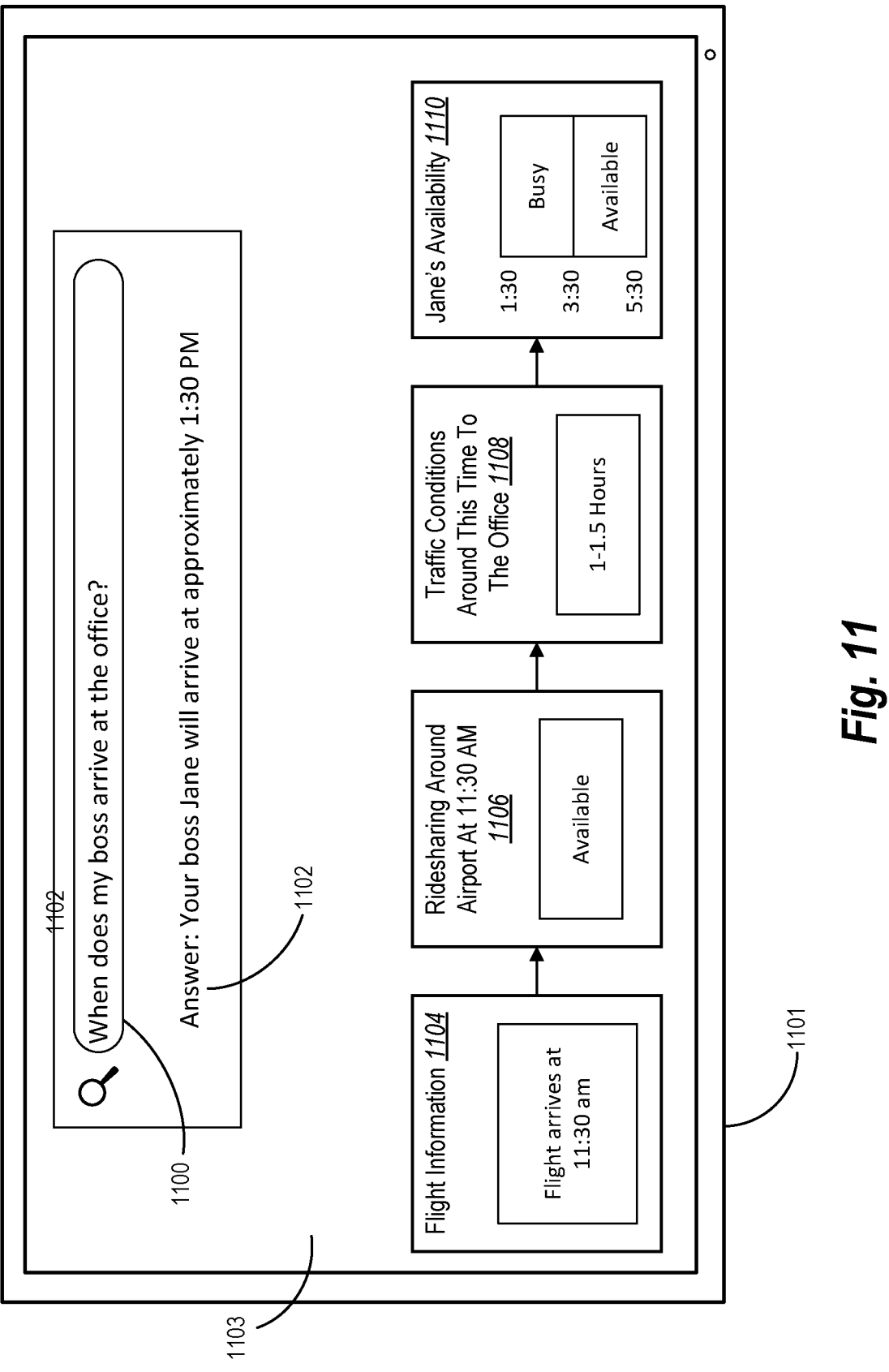
FIG. 11 illustrates an example graphical user interface of the multi-order query result system providing a response in accordance with one or more embodiments.

FIG. 11 illustrates a graphical user interface of the multi-order query result system 102 in accordance with one or more embodiments. For example, FIG. 11 shows a client device 1101 providing for display via graphical user interface 1103 an option to generate an answer. In particular, FIG. 11 shows a multi-order text query 1100 of "when does my boss arrive at the office?" Further, the graphical user interface 1103 displays an aggregated result 1102, which reads "answer: your boss Jane will arrive at approximately 1:30 p.m."

FIG. 11 further shows within the graphical user interface 1103 of the client device 1101 a proof of work for generating the aggregated result 1102. For example, FIG. 11 illustrates the multi-order query result system 102 generating and providing for display via the graphical user interface 1103 various subcomponents of the multi-order text query 1100. In particular, the various subcomponents include flight information 1104, ridesharing 1106, traffic conditions 1108, and availability 1110. For instance, each of the components 1104-1108 shown on the graphical user interface 1103 indicates to the querying user how the multi-order query result system 102 determined that the boss would arrive at around 1:30 p.m. Furthermore, the availability 1110 allows the querying user to further determine when to meet with the boss.

FIGS. 1-11, the corresponding text, and the examples provide a number of different systems and methods for generating an aggregated result for a received multi-order text query. In addition to the foregoing, implementations can also be described in terms of flowcharts comprising acts steps in a method for accomplishing a particular result. For example, FIG. 12 illustrates an example series of acts for generating an aggregated result.

While FIG. 12 illustrates acts according to certain implementations, alternative implementations may omit, add to, reorder, and/or modify any of the acts shown in FIG. 12. The acts of FIG. 12 can be performed as part of a method. Alternatively, a non-transitory computer-readable medium can comprise instructions, that when executed by one or more processors, cause a computing device to perform the acts of FIG. 12. In still further implementations, a system can perform the acts of FIG. 12.

As illustrated in FIG. 12, a series of acts 1200 may include an act 1210 of generating, from a multi-order text query, a first context-defining query subcomponent indicating a first contextual data source, an act 1220 of providing the first context-defining query subcomponent to a large language model for generating computer code, an act 1230 of executing the computer code from the large language model for generating a first result, an act 1240 of identifying a second result to a second context-defining query subcomponent generated from the multi-order text query, and an act 1250 of utilizing the first result and the second result to generate an aggregated result.

In particular the act 1210 includes generating, from a multi-order text query received from a client device, a first context-defining query subcomponent indicating a first contextual data source for responding to the first context-defining query subcomponent, the act 1220 includes providing the first context-defining query subcomponent to a large language model for generating computer code that is specific to the first contextual data source and executable for responding to the first context-defining query subcomponent, the act 1230 includes executing the computer code from the large language model using the first contextual data source accessed over a computer network for generating to generate a first result to the first context-defining query subcomponent of the multi-order text query, the act 1240 includes identifying a second result to a second context-defining query subcomponent generated from the multi-order text query, the second context-defining query subcomponent indicating a second contextual data source, and the act 1250 includes utilizing the first result and the second result to generate an aggregated result to the multi-order text query.

Further, in one or more embodiments the series of acts 1200 includes providing the multi-order text query to the large language model to generate the first context-defining query subcomponent. Additionally, in one or more embodiments the series of acts 1200 includes determining that the multi-order text query is a non-first order text query. Moreover, in one or more embodiments the series of acts 1200 includes identifying a third result to a third context-defining query subcomponent generated from the multi-order text query that indicates the first contextual data source, and utilizing the first result, the second result, and the third result to generate the aggregated result to the multi-order text query.

Furthermore, in one or more embodiments the series of acts 1200 includes transmitting the first context-defining query subcomponent to the large language model to cause the large language model to generate the computer code in a domain-specific computer language specific to the first contextual data source indicated by the first context-defining query subcomponent. Additionally, in one or more embodiments the series of acts 1200 includes a determination of the first context-defining query subcomponent or an action of the first context-defining query subcomponent. Moreover, in one or more embodiments the series of acts 1200 includes performing a first action, the first action comprising a component-specific action within the first contextual data source.

Further, in one or more embodiments the series of acts 1200 includes receiving, from the large language model, a request for sample data for generating the first result and providing, to the large language model, the sample data for training the large language model to generate the first result corresponding to the first context-defining query subcomponent. Moreover, in one or more embodiments the series of acts 1200 includes in response to utilizing the first result and the second result to generate the aggregated result to the multi-order text query, providing a response to the client device that indicates the aggregated result. Additionally, in one or more embodiments the series of acts 1200 includes a first application within an organizational ecosystem. Further, in one or more embodiments the series of acts 1200 includes a third-party application not within an organizational ecosystem.

Moreover, in one or more embodiments the series of acts 1200 includes generating, from a multi-order text query received from a client device, a first context-defining query subcomponent indicating a first contextual data source for responding to the first context-defining query subcomponent, providing the first context-defining query subcomponent to a large language model for generating domain-specific computer code that is specific to the first contextual data source and executable for responding to the first context-defining query subcomponent, executing the domain-specific computer code from the large language model to access the first contextual data source over a computer network for generating a first result to the first context-defining query subcomponent of the multi-order text query, the domain-specific computer code generates a component-specific result utilizing data stored at the first contextual data source, identifying a second result to a second context-defining query subcomponent generated from the multi-order text query, the second context-defining query subcomponent indicating a second contextual data source, and utilizing the first result and the second result to generate an aggregated result to the multi-order text query.

Furthermore, in one or more embodiments the series of acts 1200 includes determining that the first context-defining query subcomponent is unanswerable and sending a request to the client device to provide additional context for the first context-defining query subcomponent, the additional context comprising an indication of an additional contextual data source. Additionally, in one or more embodiments the series of acts 1200 includes determining that the first context-defining query subcomponent is unanswerable in response to receiving, from the large language model, a request for sample data for generating a component-specific result corresponding to the first context-defining query subcomponent of the multi-order text query and providing, to the large language model, contextual sample data for training the large language model to generate the component-specific result corresponding to the first context-defining query subcomponent of the multi-order text query.

The components of the multi-order query result system 102 can include software, hardware, or both. For example, the components of the multi-order query result system 102 can include one or more instructions stored on a computer-readable storage medium and executable by processors of one or more computing devices. When executed by one or more processors, the computer-executable instructions of the multi-order query result system 102 can cause a computing device to perform the methods described herein. Alternatively, the components of the multi-order query result system 102 can comprise hardware, such as a special purpose processing device to perform a certain function or group of functions. Additionally or alternatively, the components of the multi-order query result system 102 can include a combination of computer-executable instructions and hardware.

Furthermore, the components of the multi-order query result system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the multi-order query result system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
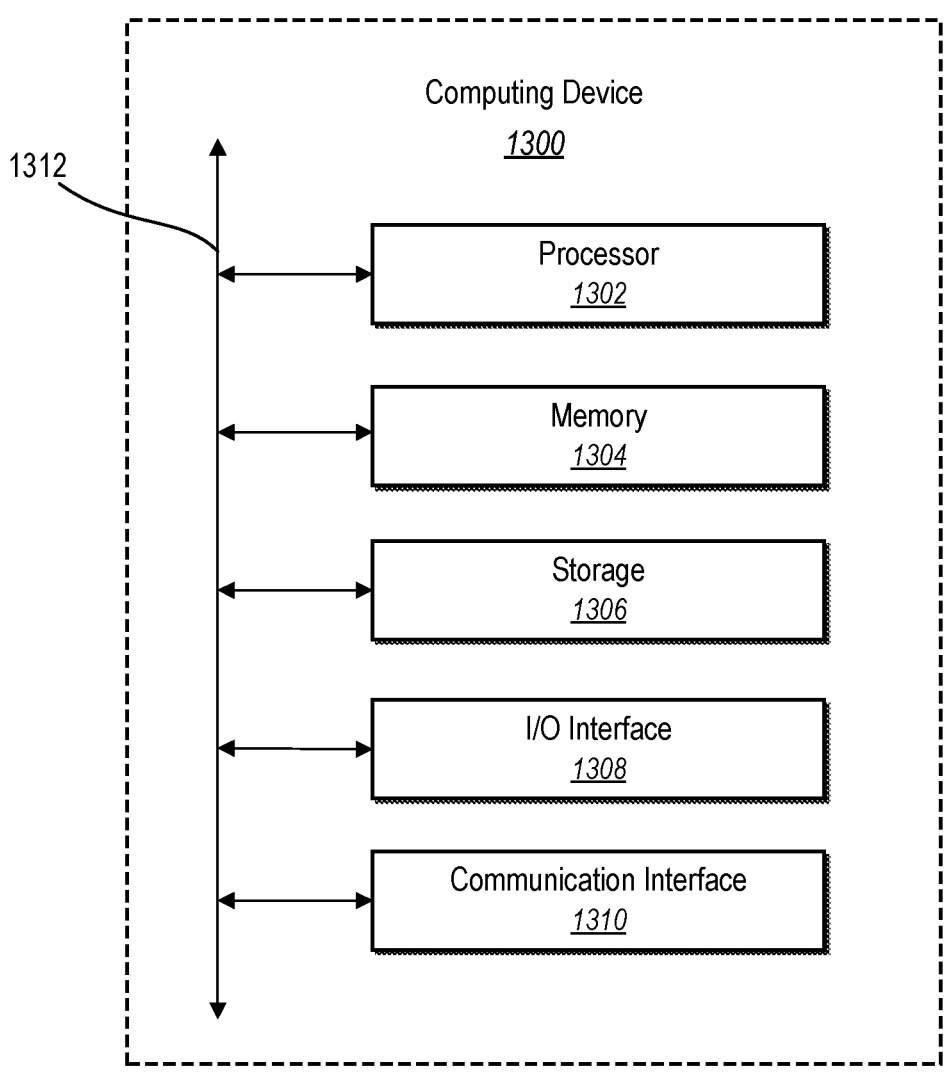
FIG. 13 illustrates a block diagram of an exemplary computing device in accordance with one or more embodiments.

FIG. 13 illustrates a block diagram of exemplary computing device 1300 (e.g., the server(s) 104 and/or the client device 108) that may be configured to perform one or more of the processes described above. One will appreciate that server(s) 104 and/or the client device 108 may comprise one or more computing devices such as computing device 1300. As shown by FIG. 13, computing device 1300 can comprise processor 1302, memory 1304, storage device 1306, I/O interface 1308, and communication interface 1310, which may be communicatively coupled by way of communication infrastructure 1312. While an exemplary computing device 1300 is shown in FIG. 13, the components illustrated in FIG. 13 are not intended to be limiting. Additional or alternative components may be used in other implementations. Furthermore, in certain implementations, computing device 1300 can include fewer components than those shown in FIG. 13. Components of computing device 1300 shown in FIG. 13 will now be described in additional detail.

In particular implementations, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage device 1306 and decode and execute them. In particular implementations, processor 1302 may include one or more internal caches for data, instructions, or addresses. As an example and not by way of limitation, processor 1302 may include one or more instruction caches, one or more data caches, and one or more translation lookaside buffers (TLBs). Instructions in the instruction caches may be copies of instructions in memory 1304 or storage device 1306.

Memory 1304 may be used for storing data, metadata, and programs for execution by the processor(s). Memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1304 may be internal or distributed memory.

Storage device 1306 includes storage for storing data or instructions. As an example and not by way of limitation, storage device 1306 can comprise a non-transitory storage medium described above. Storage device 1306 may include a hard disk drive (HDD), a floppy disk drive, flash memory, an optical disc, a magneto-optical disc, magnetic tape, or a Universal Serial Bus (USB) drive or a combination of two or more of these. Storage device 1306 may include removable or non-removable (or fixed) media, where appropriate. Storage device 1306 may be internal or external to computing device 1300. In particular implementations, storage device 1306 is non-volatile, solid-state memory. In other implementations, Storage device 1306 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1308 allows a user to provide input to, receive output from, and otherwise transfer data to and receive data from computing device 1300. I/O interface 1308 may include a mouse, a keypad or a keyboard, a touch screen, a camera, an optical scanner, network interface, modem, other known I/O devices or a combination of such I/O interfaces. I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1308 is configured to provide graphical data to a display for presentation to a user. The graphical data may be representative of one or more graphical user interfaces and/or any other graphical content as may serve a particular implementation.

Communication interface 1310 can include hardware, software, or both. In any event, communication interface 1310 can provide one or more interfaces for communication (such as, for example, packet-based communication) between computing device 1300 and one or more other computing devices or networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1310 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1310 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1312 may include hardware, software, or both that couples components of computing device 1300 to each other. As an example and not by way of limitation, communication infrastructure 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 14:
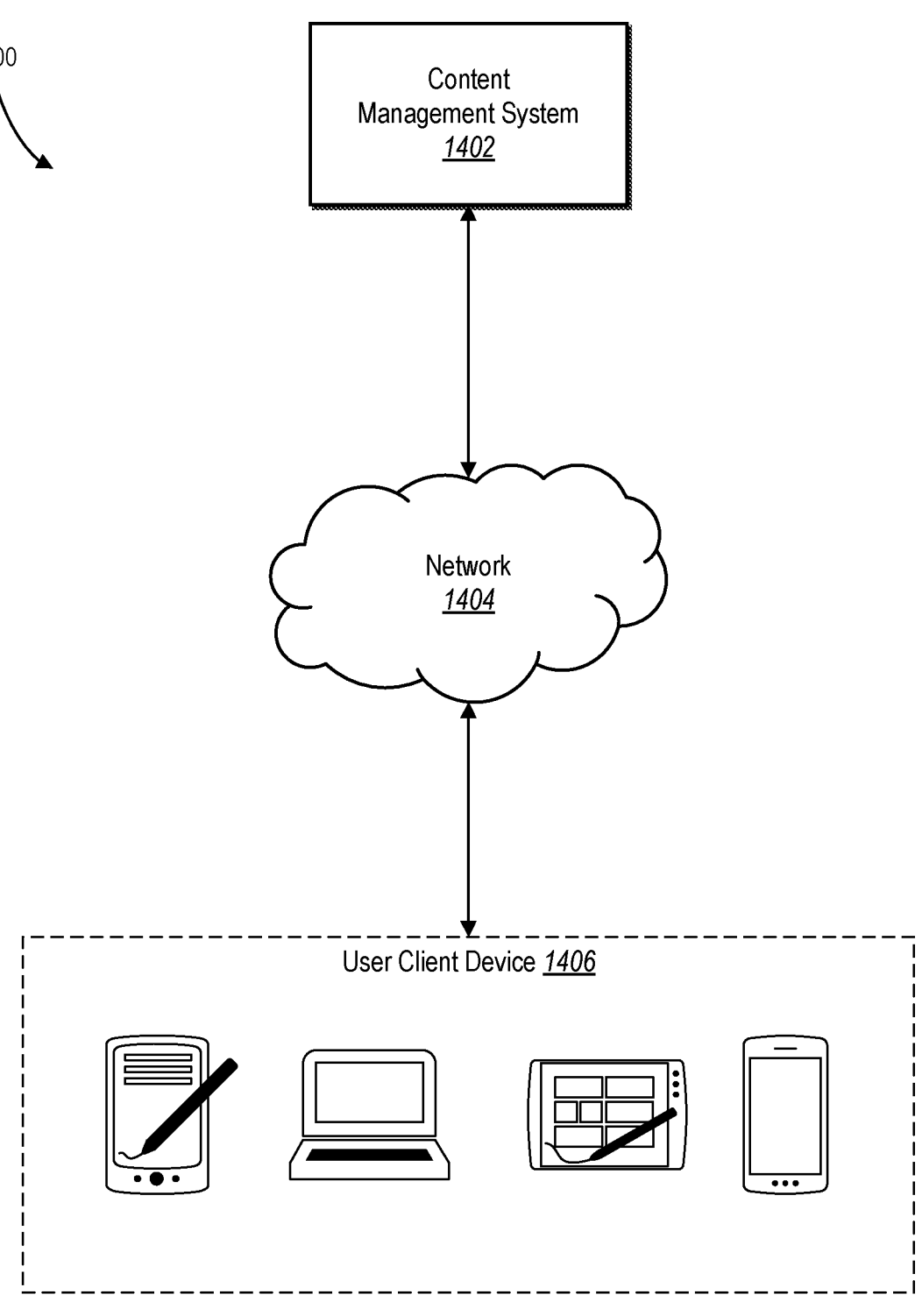
FIG. 14 illustrates an example environment of a networking system having the multi-order query result system in accordance with one or more embodiments.

FIG. 14 is a schematic diagram illustrating environment 1400 within which one or more implementations of the multi-order query result system 102 can be implemented. For example, the multi-order query result system 102 may be part of a content management system 1402 (e.g., the content management system 106). Content management system 1402 may generate, store, manage, receive, and send digital content (such as digital content items). For example, content management system 1402 may send and receive digital content to and from client device of client devices 1406 by way of network 1404. In particular, content management system 1402 can store and manage a collection of digital content. Content management system 1402 can manage the sharing of digital content between computing devices associated with a plurality of users. For instance, content management system 1402 can facilitate a user sharing a digital content with another user of content management system 1402.

In particular, content management system 1402 can manage synchronizing digital content across multiple client devices 1406 associated with one or more users. For example, a user may edit digital content using a client device of the client device 1406. The content management system 1402 can cause client device of the client devices 1406 to send the edited digital content to content management system 1402. Content management system 1402 then synchronizes the edited digital content on one or more additional computing devices.

In addition to synchronizing digital content across multiple devices, one or more implementations of content management system 1402 can provide an efficient storage option for users that have large collections of digital content. For example, content management system 1402 can store a collection of digital content on content management system 1402, while the client device of the client devices 1406 only stores reduced-sized versions of the digital content. A user can navigate and browse the reduced-sized versions (e.g., a thumbnail of a digital image) of the digital content on client device of the client devices 1406. In particular, one way in which a user can experience digital content is to browse the reduced-sized versions of the digital content on client device of client devices 1406.

Another way in which a user can experience digital content is to select a reduced-size version of digital content to request the full- or high-resolution version of digital content from content management system 1402. In particular, upon a user selecting a reduced-sized version of digital content, client device of client devices 1406 sends a request to content management system 1402 requesting the digital content associated with the reduced-sized version of the digital content. Content management system 1402 can respond to the request by sending the digital content to client device of client devices 1406. Client device of client devices 1406, upon receiving the digital content, can then present the digital content to the user. In this way, a user can have access to large collections of digital content while minimizing the amount of resources used on client device of client devices 1406.

client device of client devices 1406 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1406 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1404.

Network 1404 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1406 may access content management system 1402.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, a multi-order text query comprising a plurality of context-defining query subcomponents that each require one or more different actions for generating an aggregated result to the multi-order text query;

identifying, from the multi-order text query and utilizing a large language model trained on multi-order text query sample data, a first context-defining query subcomponent indicating a first contextual data source for responding to the first context-defining query subcomponent;

providing the first context-defining query subcomponent to the large language model for generating computer code that is specific to the first contextual data source and executable for responding to the first context-defining query subcomponent;

executing the computer code from the large language model using the first contextual data source accessed over a computer network to generate a first result to the first context-defining query subcomponent of the multi-order text query;

generating a second result to a second context-defining query subcomponent identified from the multi-order text query, the second context-defining query subcomponent indicating a second contextual data source;

utilizing the first result and the second result to generate an aggregated result to the multi-order text query; and providing, for display via a graphical user interface of the client device, the aggregated result to the multi-order text query.

2. The computer-implemented method of claim 1, wherein identifying the first context-defining query subcomponent further comprises providing the multi-order text query to the large language model to generate the first context-defining query subcomponent.

3. The computer-implemented method of claim 1, wherein identifying the first context-defining query subcomponent comprises determining that the multi-order text query is a non-first order text query.

4. The computer-implemented method of claim 1, further comprises:

generating a third result to a third context-defining query subcomponent generated from the multi-order text query that indicates the first contextual data source; and utilizing the first result, the second result, and the third result, to generate the aggregated result to the multi-order text query.

5. The computer-implemented method of claim 1, wherein providing the first context-defining query subcomponent to the large language model for generating computer code comprises transmitting the first context-defining query subcomponent to the large language model to cause the large language model to generate the computer code in a domain-specific computer language specific to the first contextual data source indicated by the first context-defining query subcomponent.

6. The computer-implemented method of claim 1, wherein executing the computer code to generate the first result further comprises at least one of a determination of the first context-defining query subcomponent or an action of the first context-defining query subcomponent, wherein the determination of the first context-defining query subcomponent indicates an answer in response to the multi-order text query.

7. The computer-implemented method of claim 1, wherein generating the first result comprises performing a first action, the first action comprising a component-specific action within the first contextual data source.

8. The computer-implemented method of claim 1, further comprising:

receiving, from the large language model, a request for sample data for generating the first result; and providing, to the large language model, the sample data for training the large language model to generate the first result corresponding to the first context-defining query subcomponent.

9. The computer-implemented method of claim 1, further comprising, in response to utilizing the first result and the second result to generate the aggregated result to the multi-order text query, providing, for display via the graphical user interface of the client device, the aggregated result and a breakdown of the aggregated result comprising the first result of the multi-order text query and the second result of the multi-order text query.

10. The computer-implemented method of claim 1, wherein the first contextual data source comprises a first application within an organizational ecosystem.

11. The computer-implemented method of claim 1, wherein the second contextual data source comprises a third-party application not within an organizational ecosystem.

12. A system comprising:

at least one processor; and a non-transitory computer readable medium comprising instructions that, when executed by the at least one processor, cause the system to:

receive, from a client device, a multi-order text query comprising a plurality of context-defining query subcomponents that each require one or more different actions for generating an aggregated result to the multi-order text query;

identify, from the multi-order text query and utilizing a large language model trained on multi-order text query sample data, a first context-defining query subcomponent indicating a first contextual data source for responding to the first context-defining query subcomponent;

provide the first context-defining query subcomponent to the large language model for generating domain-specific computer code that is specific to the first contextual data source and executable for responding to the first context-defining query subcomponent;

execute the domain-specific computer code from the large language model using the first contextual data source accessed over a computer network to generate a first result to the first context-defining query subcomponent of the multi-order text query, the domain-specific computer code generates a component-specific result utilizing data stored at the first contextual data source;

generate a second result to a second context-defining query subcomponent identified from the multi-order text query, the second context-defining query subcomponent indicating a second contextual data source;

utilize the first result and the second result to generate an aggregated result to the multi-order text query; and provide, for display via a graphical user interface of the client device, the aggregated result to the multi-order text query.

13. The system of claim 12, further comprising instructions that, when executed by the at least one processor, cause the system to:

determine that the multi-order text query is a non-first order text query; and generate a third result to a third context-defining query subcomponent generated from the multi-order text query that indicates the first contextual data source.

14. The system of claim 13, further comprising instructions that, when executed by the at least one processor, cause the system to utilize the first result, the second result, and the third result to generate the aggregated result to the multi-order text query.

15. The system of claim 12, further comprising instructions that, when executed by the at least one processor, cause the system to generate at least one of a determination related to the first context-defining query subcomponent or an action of the first context-defining query subcomponent, wherein the determination of the first context-defining query subcomponent indicates an answer in response to the multi-order text query.

16. The system of claim 12, further comprising instructions that, when executed by the at least one processor, cause the system to:

determine that the first context-defining query subcomponent is unanswerable; and send a request to the client device to provide additional context for the first context-defining query subcomponent, the additional context comprising an indication of an additional contextual data source.

17. The system of claim 12, further comprising instructions that, when executed by the at least one processor, cause the system to:

determine that the first context-defining query subcomponent is unanswerable in response to receiving, from the large language model, a request for sample data for generating a component-specific result corresponding to the first context-defining query subcomponent of the multi-order text query; and provide, to the large language model, contextual sample data for training the large language model to generate the component-specific result corresponding to the first context-defining query subcomponent of the multi-order text query.

18. A non-transitory computer readable medium comprising instructions that, when executed by at least one processor, cause the at least one processor to:

receive, from a client device, a multi-order text query comprising a plurality of context-defining query subcomponents that each require one or more different actions for generating an aggregated result to the multi-order text query;

identify, from the multi-order text query and utilizing a large language model trained on multi-order text query sample data, a first context-defining query subcomponent indicating a first contextual data source for responding to the first context-defining query subcomponent, wherein the multi-order text query is a non-first order text query;

provide the first context-defining query subcomponent to the large language model for generating computer code that is specific to the first contextual data source and executable for responding to the first context-defining query subcomponent;

execute the computer code from the large language model to access the first contextual data source over a computer network for generating a first result to the first context-defining query subcomponent of the multi-order text query;

generate a second result to a second context-defining query subcomponent generated from the multi-order text query, the second context-defining query subcomponent indicating a second contextual data source;

utilize the first result and the second result to generate an aggregated result to the multi-order text query; and provide, for display via a graphical user interface of the client device, the aggregated result to the multi-order text query.

19. The non-transitory computer readable medium of claim 18, further comprising instructions that, when executed by the at least one processor, cause the at least one processor to transmit the first context-defining query subcomponent to the large language model to cause the large language model to generate the computer code in a domain-specific computer language specific to the first contextual data source indicated by the first context-defining query subcomponent.

20. The non-transitory computer readable medium of claim 18, further comprising instructions that, when executed by the at least one processor, cause the at least one processor to integrate a first application corresponding to the client device and a second application corresponding to an organization ecosystem, the first contextual data source comprising the first application and the second contextual data source comprising the second application.

\* \* \* \* \*